US009537638B2

(12) United States Patent
Geirhofer et al.

(10) Patent No.: US 9,537,638 B2
(45) Date of Patent: Jan. 3, 2017

(54) METHOD AND APPARATUS FOR PERFORMING COORDINATED MULTIPOINT FEEDBACK UNDER MULTIPLE CHANNEL AND INTERFERENCE ASSUMPTIONS

(71) Applicant: QUALCOMM Incorporated, San Diego, CA (US)

(72) Inventors: Stefan Geirhofer, San Diego, CA (US); Wanshi Chen, San Diego, CA (US); Peter Gaal, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 13/890,608

(22) Filed: May 9, 2013

(65) Prior Publication Data
US 2013/0301450 A1 Nov. 14, 2013

Related U.S. Application Data

(60) Provisional application No. 61/645,827, filed on May 11, 2012.

(51) Int. Cl.
*H04W 4/00* (2009.01)
*H04L 5/00* (2006.01)
*H04B 7/02* (2006.01)

(52) U.S. Cl.
CPC ............. *H04L 5/0057* (2013.01); *H04B 7/024* (2013.01)

(58) Field of Classification Search
CPC ........... H04L 2012/5608; H04W 84/12; H04W 88/08; H04W 80/04; H04W 88/06; H04W 84/18; H04W 36/30; H04W 36/24
(Continued)

(56) References Cited

U.S. PATENT DOCUMENTS 8,913,674 B2 * 12/2014 Han ..................... H04B 7/0413
375/260
2011/0242982 A1 * 10/2011 Lunttila .................. H04L 5/001
370/241
(Continued)

FOREIGN PATENT DOCUMENTS

WO 2013025558 A1 2/2013

OTHER PUBLICATIONS

International Search Report and Written Opinion—PCT/US2013/040480—ISA/EPO—Aug. 23, 2013.
(Continued)

*Primary Examiner* — Brenda H Pham
(74) *Attorney, Agent, or Firm* — Patterson & Sheridan, L.L.P.

(57) ABSTRACT

Certain aspects of the present disclosure provide methods and apparatus for performing coordinated multipoint (CoMP) channel state information (CSI) feedback under multiple channel and interference assumptions. One method generally includes receiving signaling indicating at least one or more interference measurement resources (IMRs) from a network and a configuration with one or more non-zero power reference signal (NZP-RS) resources in which one or more base stations transmit a RS, performing separate interference measurements at least on a per-IMR basis in one or more subframes by forming a baseline interference estimate based on the IMR and forming separate interference estimates based on adding interference from selected NZP-RS resources to the baseline interference estimate, and transmitting one or more CSI feedback reports that correspond to the interference measurements.

42 Claims, 17 Drawing Sheets

(58) Field of Classification Search
USPC ..... 370/310.2, 328, 332, 338, 349, 322, 329
See application file for complete search history.

(56) References Cited

U.S. PATENT DOCUMENTS

| | | | |
|---|---|---|---|
| 2011/0305161 A1* | 12/2011 | Ekpenyong et al. | 370/252 |
| 2012/0113812 A1* | 5/2012 | Ji | H04W 72/1263 370/241 |
| 2012/0134275 A1 | 5/2012 | Choi et al. | |
| 2012/0208547 A1* | 8/2012 | Geirhofer et al. | 455/452.2 |
| 2012/0213107 A1 | 8/2012 | Jang et al. | |
| 2012/0287875 A1 | 11/2012 | Kim et al. | |
| 2013/0039199 A1 | 2/2013 | Liao et al. | |
| 2013/0094384 A1 | 4/2013 | Park et al. | |
| 2014/0286189 A1* | 9/2014 | Kang et al. | 370/252 |

OTHER PUBLICATIONS

LG Electronics: "Consideration on interference measurement for CoMP CSI feedback", 3GPP Draft; R1-121441, 3rd Generation Partnership Project (3GPP), Mobile Competence Centre. 650, Route Des Lucioles. F-06921 Sophia-Anti Polis Cedex. France, vol. RAN WG1, no. Jeju, Korea; Mar. 26, 2012-Mar. 30, 2012, Mar. 20, 2012, XP050599724, [retrieved on Mar. 20, 2012].

"LTE; Evolved Universal Terrestrial Radio Access (E-UTRA); Physical channels and modulation (3GPP TS 36.211 version 10.4.0 Release 10)", Technical Specification. European Telecommunications Standards Institute (ETSI). 650, Route Des Lucioles; F-06921 Sophia-Antipolis; France, vol. 3GPP RAN 1. No. V10.4.0, Jan. 1, 2012, XP014069597, A paragraph [6.10.5]-paragraph [6.10.6.3].

"LTE; Evolved Universal Terrestrial Radio Access (E-UTRA); Physical layer procedures (3GPP TS 36.213 version 10.5.0 Release 10)", Technical Specification, European Telecommunications Standards Institute (ETSI). 650, Route Des Lucioles; F-06921 Sophia-Antipolis; France. vol. 3GPP RAN 1, No. V10.5.0, Mar. 1, 2012, XP014070078, paragraph [07.2]-paragraph [7.2.5].

Qualcomm Incorporated: "CSI feedback reporting in support of CoMP", 3GPP Draft; R1-121559 CSI Feedback Reporting in Support of COMP, 3rd Generation Partnership Project (3GPP). Mobile Competence Centre; 650, Route Des Lucioles; F-06921 Sophia-Antipolis Cedex ; France. vol. RAN WG1, no. Jeju. Korea; Mar. 26, 2012-Mar. 30, 2012, Mar. 20, 2012, XP050599829. [retrieved on Mar. 20, 2012] the whole document.

Samsung: "Interference Measurement Resource for Downlink CoMP", 3GPP Draft; R1-121627, 3rd Generation Partnership Project (3GPP), Mobile Competence Centre; 650, Route Des Lucioles; F-06921 Sophia-Antipolis Cedex; France, vol. RAN WG1, no. Jeju. Korea; Mar. 26, 2012-Mar. 30, 2012. Mar. 20, 2012, XP050599890, [retrieved on Mar. 20, 2012] the whole document.

* cited by examiner

METHOD AND APPARATUS FOR PERFORMING COORDINATED MULTIPOINT FEEDBACK UNDER MULTIPLE CHANNEL AND INTERFERENCE ASSUMPTIONS

CROSS-REFERENCE TO RELATED APPLICATIONS

This application claims benefit of U.S. Provisional Patent Application Ser. No. 61/645,827, filed 11 May 2012, which is expressly incorporated by reference herein in its entirety.

BACKGROUND

Field

The present disclosure relates generally to communication systems, and more particularly, to a system and method for performing coordinated multipoint (CoMP) channel state information (CSI) feedback under multiple channel and interference assumptions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects of the present disclosure provide a method for wireless communications by a user equipment (UE). The method generally includes receiving signaling indicating at least one or more interference measurement resources (IMRs) from a network and a configuration with one or more non-zero power reference signal (NZP-RS) resources in which one or more base stations transmit a RS, performing separate interference measurements at least on a per-IMR basis in one or more subframes by forming a baseline interference estimate based on the IMR and forming separate interference estimates based on adding interference from selected NZP-RS resources to the baseline interference estimate, and transmitting one or more channel state information (CSI) feedback reports that correspond to the interference measurements.

Certain aspects of the present disclosure provide an apparatus for wireless communications by a UE. The apparatus generally includes means for receiving signaling indicating at least one or more interference measurement resources (IMRs) from a network and a configuration with one or more non-zero power reference signal (NZP-RS) resources in which one or more base stations transmit a RS, means for performing separate interference measurements at least on a per-IMR basis in one or more subframes by forming a baseline interference estimate based on the IMR and forming separate interference estimates based on adding interference from selected NZP-RS resources to the baseline interference estimate, and means for transmitting one or more channel state information (CSI) feedback reports that correspond to the interference measurements.

Certain aspects of the present disclosure provide an apparatus for wireless communications by a UE. The apparatus generally includes at least one processor and a memory coupled to the at least one processor. The at least one processor is generally configured to receive signaling indicating at least one or more interference measurement resources (IMRs) from a network and a configuration with one or more non-zero power reference signal (NZP-RS) resources in which one or more base stations transmit a RS, perform separate interference measurements at least on a per-IMR basis in one or more subframes by forming a baseline interference estimate based on the IMR and forming separate interference estimates based on adding interference from selected NZP-RS resources to the baseline interference estimate, and transmit one or more channel state information (CSI) feedback reports that correspond to the interference measurements.

Certain aspects of the present disclosure provide a computer-program product for wireless communications by a UE. The computer-program product generally comprises a non-transitory computer-readable medium having code stored thereon, the code executable by one or more processors for receiving signaling indicating at least one or more interference measurement resources (IMRs) from a network and a configuration with one or more non-zero power reference signal (NZP-RS) resources in which one or more base stations transmit a RS, performing separate interference measurements at least on a per-IMR basis in one or more subframes by forming a baseline interference estimate based on the IMR and forming separate interference estimates based on adding interference from selected NZP-RS resources to the baseline interference estimate, and transmitting one or more channel state information (CSI) feedback reports that correspond to the interference measurements.

Certain aspects of the present disclosure provide a method for wireless communications by a base station. The method generally includes generating channel state information reference signals (CSI-RSs) for one or more user equipments (UEs) that provide CSI feedback about multiple cells and do not have a common subframe numbering, and transmitting the CSI-RSs to a UE according to a subframe numbering used by the UE.

Certain aspects of the present disclosure provide an apparatus for wireless communications by a base station. The apparatus generally includes means for generating channel state information reference signals (CSI-RSs) for one or more user equipments (UEs) that provide CSI feedback about multiple cells and do not have a common subframe numbering, and means for transmitting the CSI-RSs to a UE according to a subframe numbering used by the UE.

Certain aspects of the present disclosure provide an apparatus for wireless communications by a base station. The apparatus generally includes at least one processor and a memory coupled to the at least one processor. The at least one processor is generally configured to generate channel state information reference signals (CSI-RSs) for one or more user equipments (UEs) that provide CSI feedback about multiple cells and do not have a common subframe numbering, and transmit the CSI-RSs to a UE according to a subframe numbering used by the UE.

Certain aspects of the present disclosure provide a computer-program product for wireless communications by a base station. The computer-program product generally includes a non-transitory computer-readable medium having code stored thereon, the code executable by one or more processors for generating channel state information reference signals (CSI-RSs) for one or more user equipments (UEs) that provide CSI feedback about multiple cells and do not have a common subframe numbering, and transmitting the CSI-RSs to a UE according to a subframe numbering used by the UE.

Certain aspects of the present disclosure provide a method for wireless communications by a base station. The method generally includes transmitting signaling indicating at least one or more interference measurement resources (IMRs) and a configuration with one or more non-zero power reference signal (NZP-RS) resources in which the base station transmits a RS, transmitting at least signals or data transmissions such that interference conditions encountered by a user equipment (UE) on the IMRs include only interference from a subset of transmission points, and receiving one or more channel state information (CSI) feedback reports that correspond to separate interference measurements performed at the UE at least on a per-IMR basis in one or more subframes wherein the CSI reports correspond to separate interference estimates based on adding interference from selected NZP-RS resources to a baseline interference estimate based on the IMR.

Certain aspects of the present disclosure provide an apparatus for wireless communications by a base station. The apparatus generally includes means for transmitting signaling indicating at least one or more interference measurement resources (IMRs) and a configuration with one or more non-zero power reference signal (NZP-RS) resources in which the base station transmits a RS, means for transmitting at least signals or data transmissions such that interference conditions encountered by a user equipment (UE) on the IMRs include only interference from a subset of transmission points, and means for receiving one or more channel state information (CSI) feedback reports that correspond to separate interference measurements performed at the UE at least on a per-IMR basis in one or more subframes wherein the CSI reports correspond to separate interference estimates based on adding interference from selected NZP-RS resources to a baseline interference estimate based on the IMR.

Certain aspects of the present disclosure provide an apparatus for wireless communications by a base station. The apparatus generally includes at least one processor and a memory coupled to the at least one processor. The at least one processor is generally configured to transmit signaling indicating at least one or more interference measurement resources (IMRs) and a configuration with one or more non-zero power reference signal (NZP-RS) resources in which the base station transmits a RS, transmit at least signals or data transmissions such that interference conditions encountered by a user equipment (UE) on the IMRs include only interference from a subset of transmission points, and receive one or more channel state information (CSI) feedback reports that correspond to separate interference measurements performed at the UE at least on a per-IMR basis in one or more subframes wherein the CSI reports correspond to separate interference estimates based on adding interference from selected NZP-RS resources to a baseline interference estimate based on the IMR.

Certain aspects of the present disclosure provide a computer-program product for wireless communications by a base station. The computer-program product generally includes a non-transitory computer-readable medium having code stored thereon, the code executable by one or more processors for transmitting signaling indicating at least one or more interference measurement resources (IMRs) and a configuration with one or more non-zero power reference signal (NZP-RS) resources in which the base station transmits a RS, transmitting at least signals or data transmissions such that interference conditions encountered by a user equipment (UE) on the IMRs include only interference from a subset of transmission points, and receiving one or more channel state information (CSI) feedback reports that correspond to separate interference measurements performed at the UE at least on a per-IMR basis in one or more subframes wherein the CSI reports correspond to separate interference estimates based on adding interference from selected NZP-RS resources to a baseline interference estimate based on the IMR.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
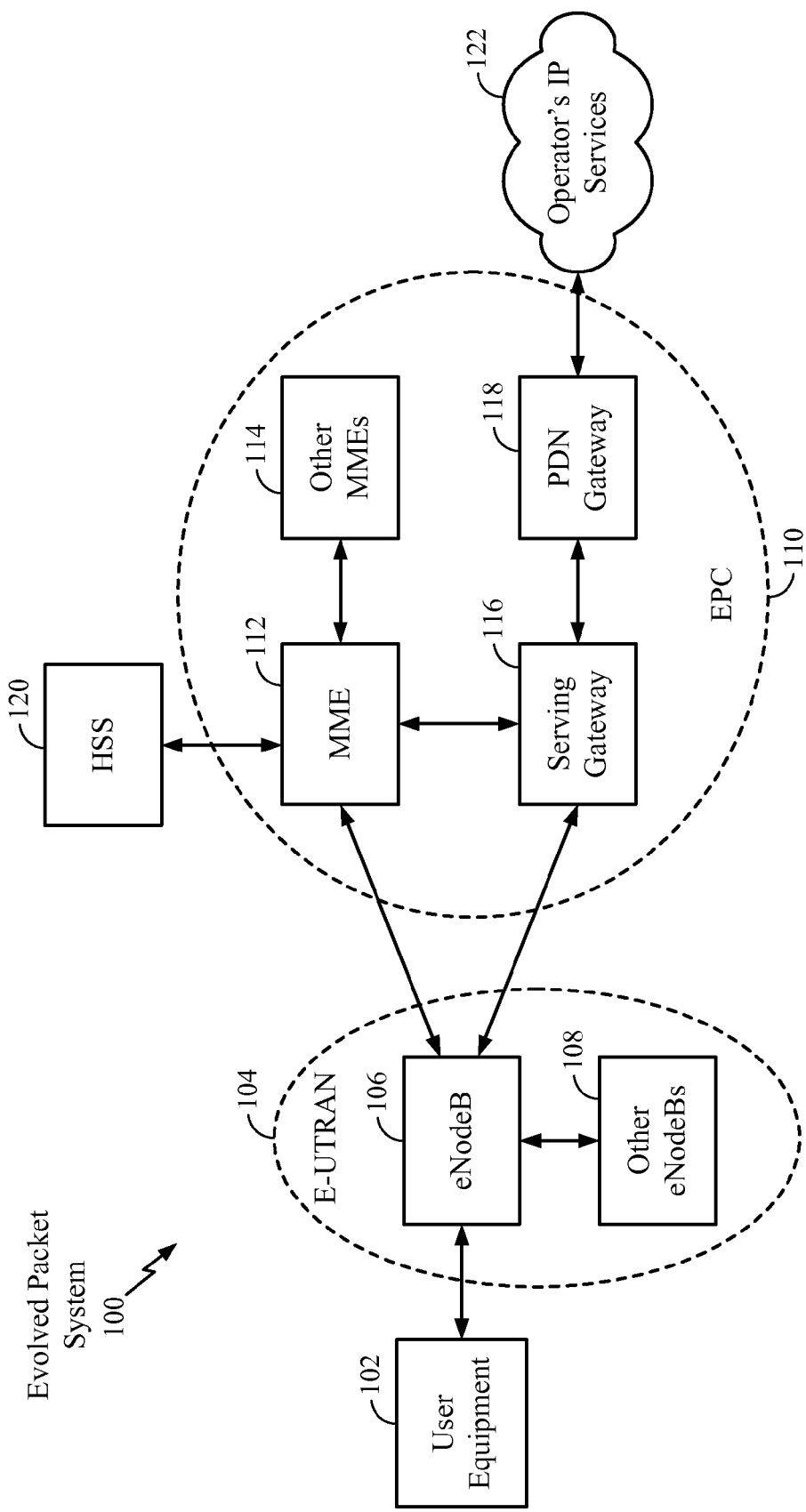
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
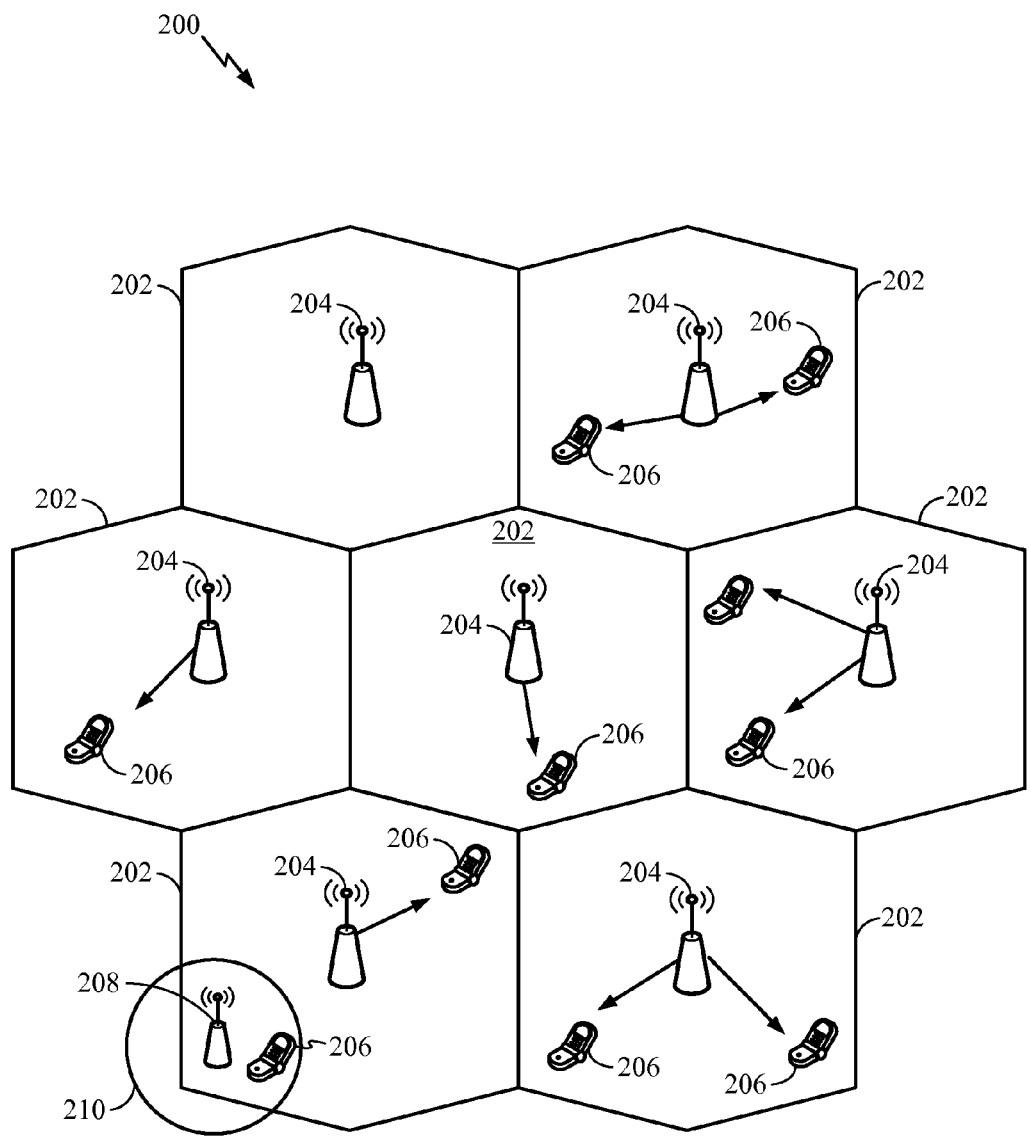
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
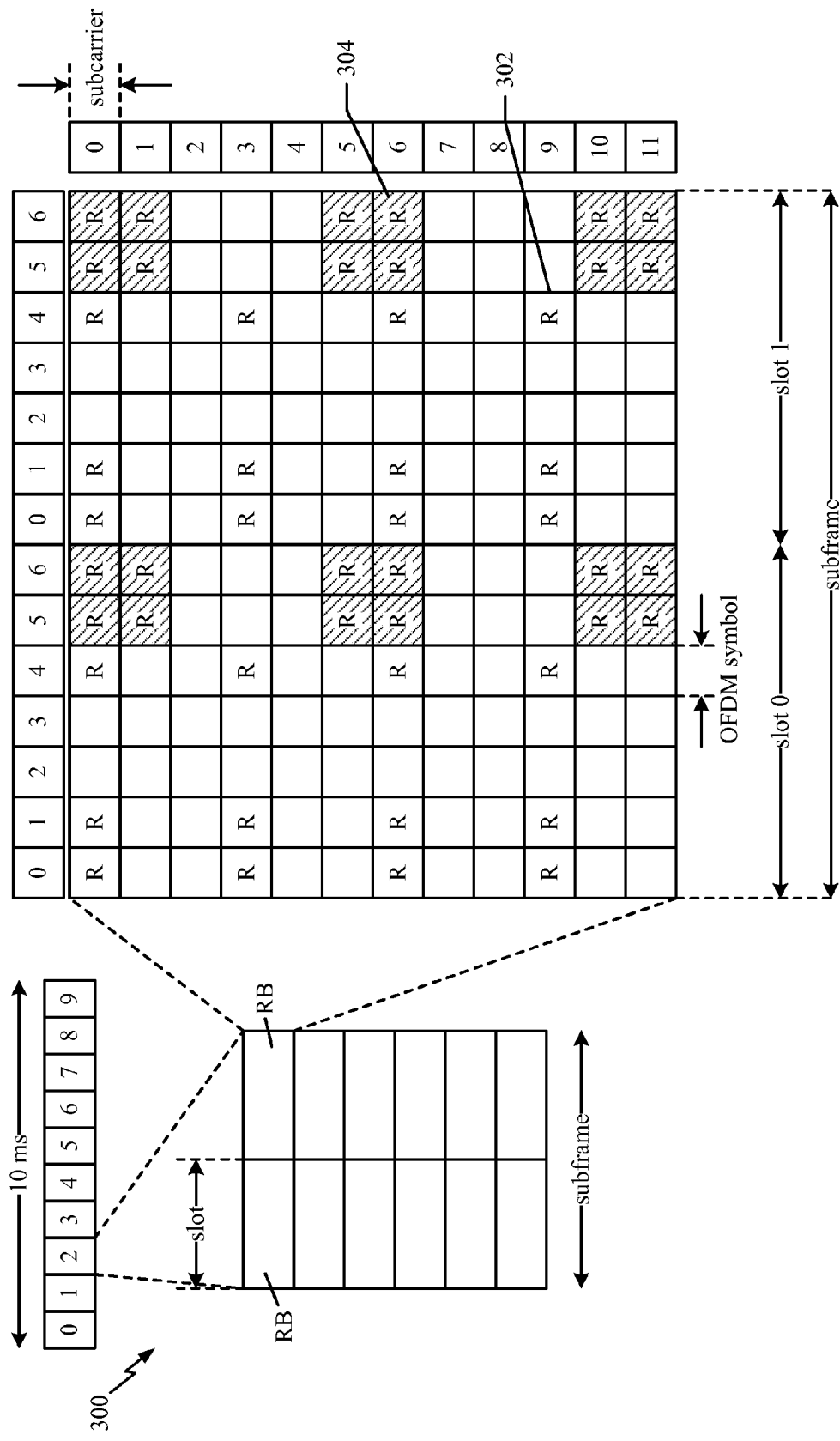
FIG. 3 is a diagram illustrating an example of a frame structure for use in an access network.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
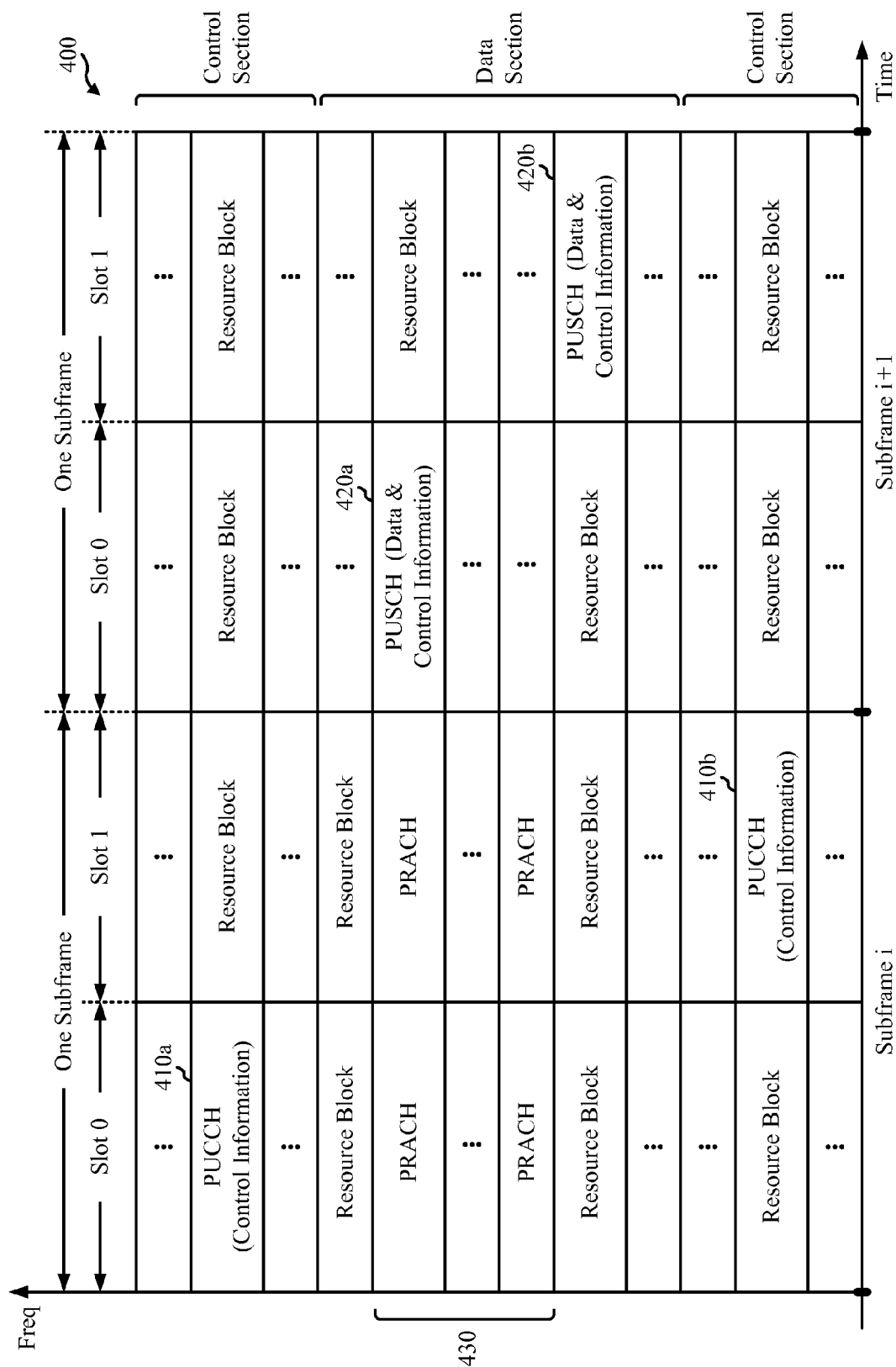
FIG. 4 shows an exemplary format for the UL in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
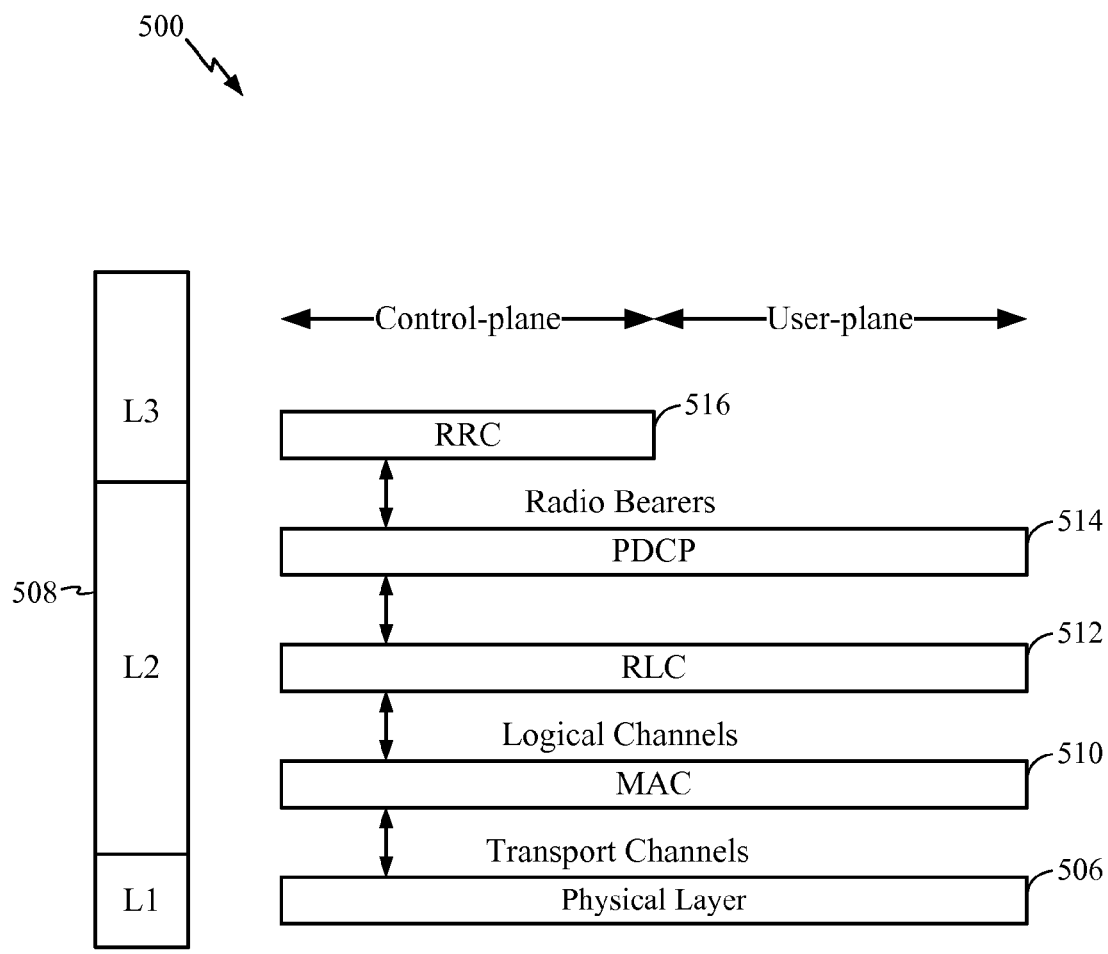
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
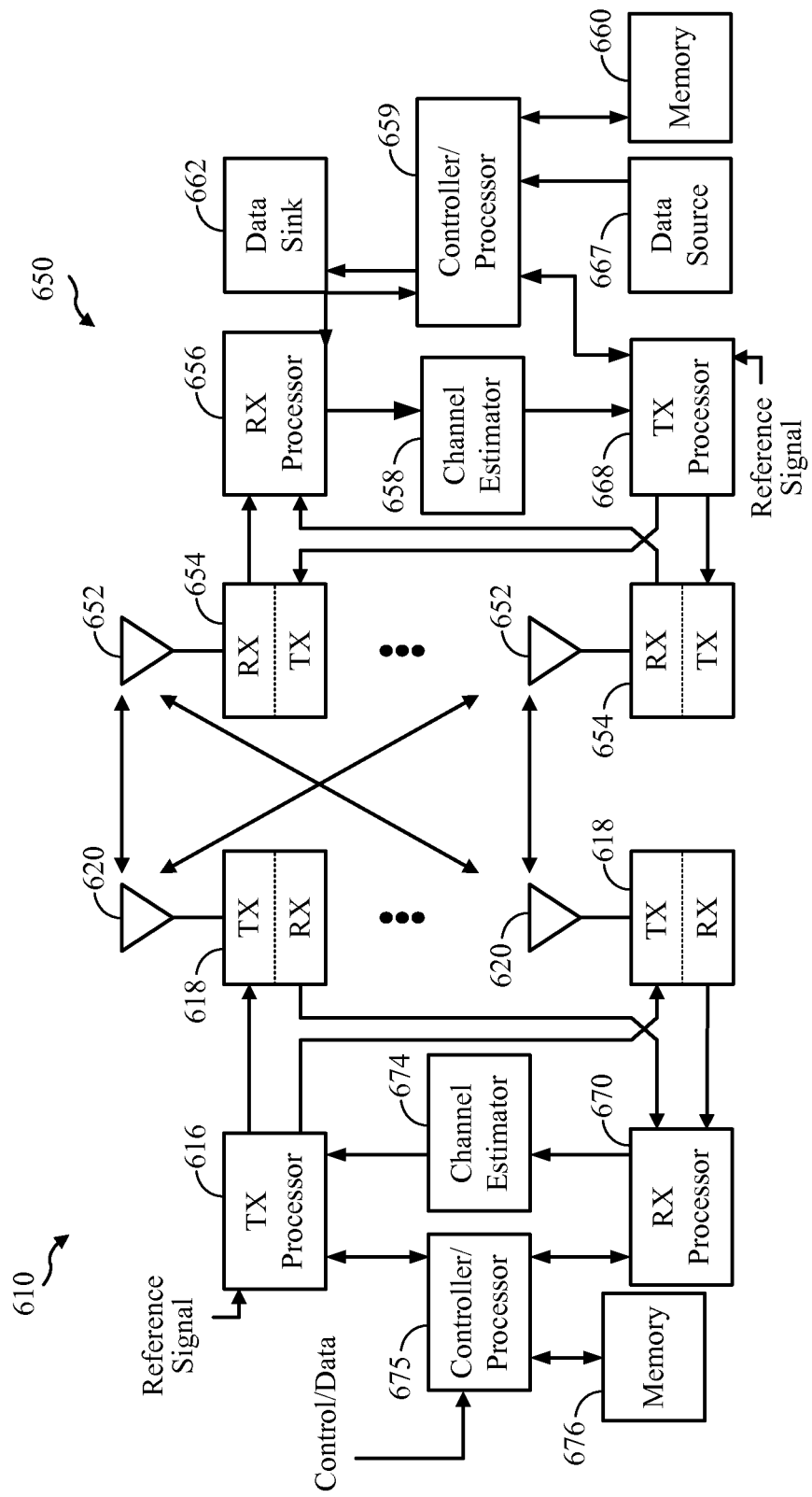
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
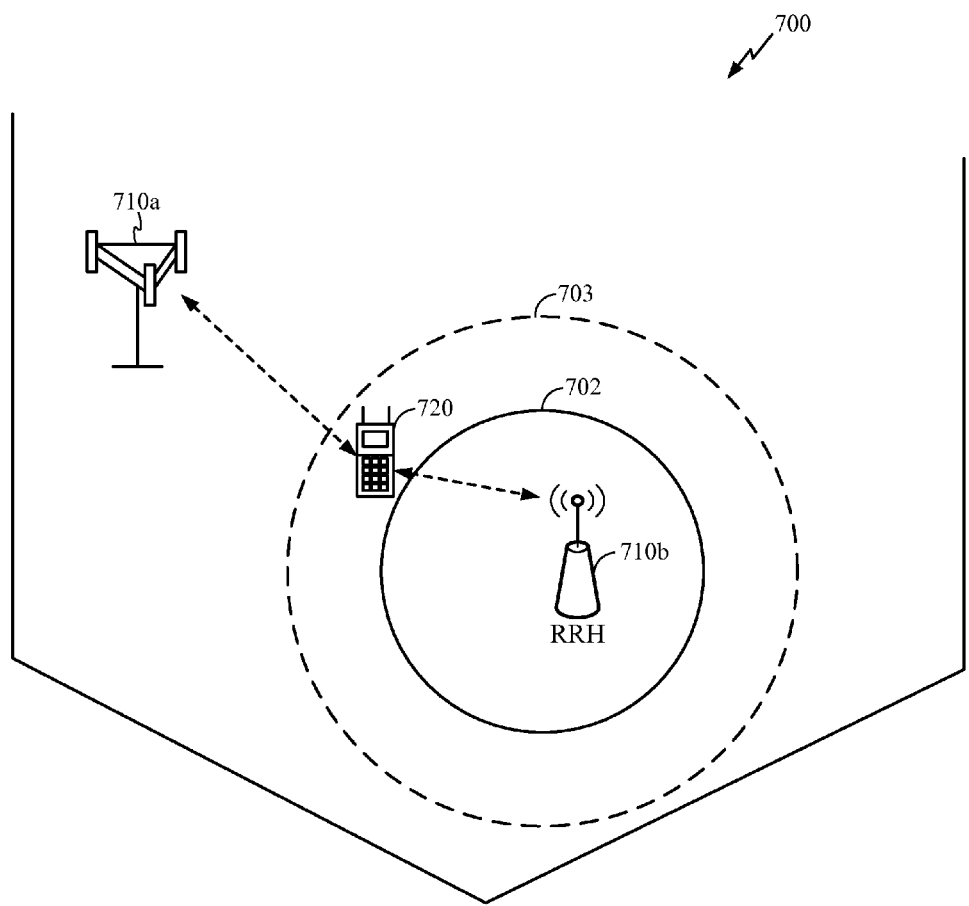
FIG. 7 is a diagram illustrating a range expanded cellular region in a heterogeneous network.

FIG. 7 is a diagram 700 illustrating a range expanded cellular region in a heterogeneous network. A lower power class eNB, such as the RRH 710b, may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
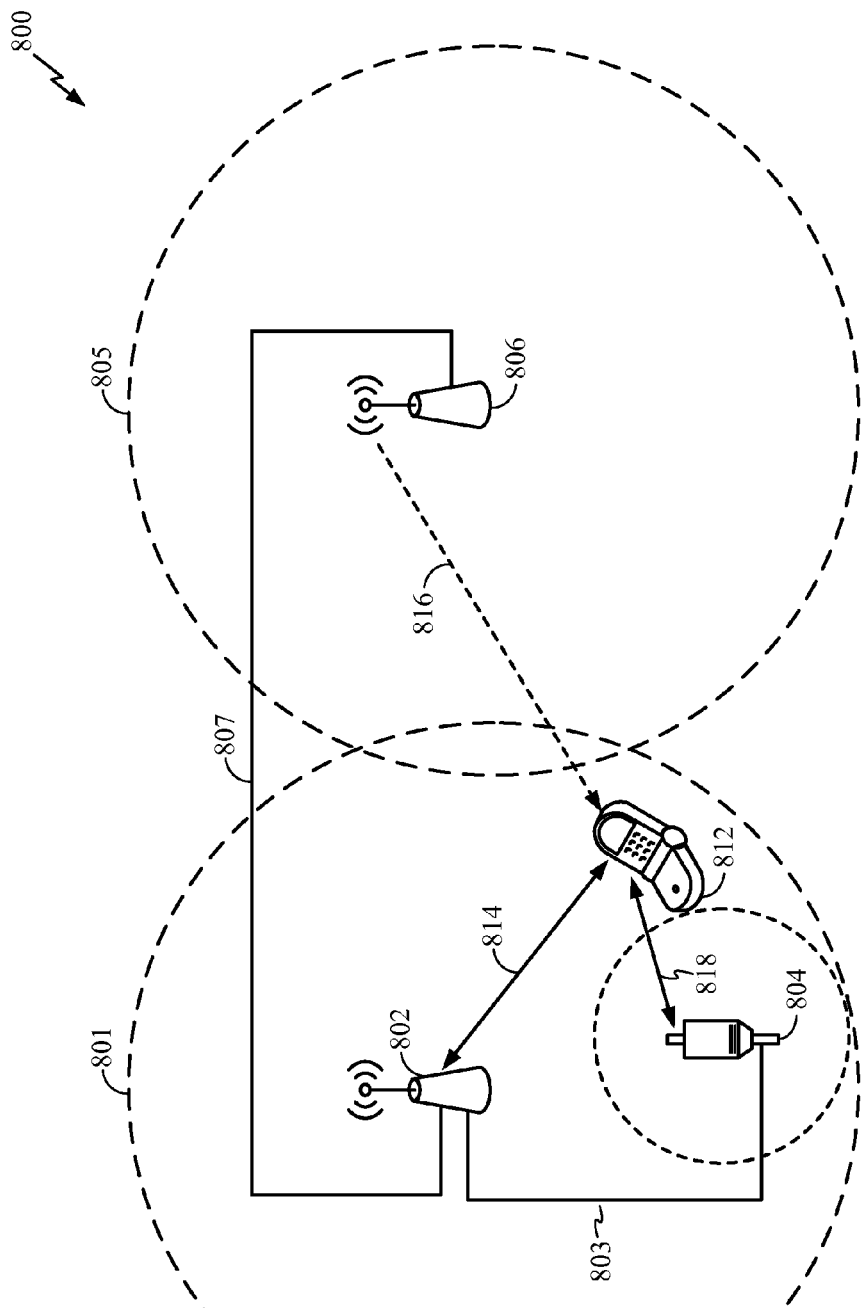
FIG. 8 is a diagram illustrating an example Macro eNB/RRH CoMP configuration in an access network.

FIG. 8 is a diagram illustrating an example Macro eNB and RRH configuration in access network 800. Access network 800 may include multiple clusters 801 of CoMP transmission points. A CoMP cluster 801 may include one or more macro eNBs 802 and one or more RRHs 804. As used herein, the CoMP cluster may be referenced to as heterogeneous where entity 804 operates with reduced transmit power, and the CoMP cluster may be referenced to as homogenous where entity 804 transmits with the same transmit power as another macro eNB. For both homogeneous and heterogeneous deployments, there may be one or more RRHs 804. In one aspect, macro eNB 802 and RRHs 804 may be connected 806 through fiber cable 803, X2 backhaul 807, etc. Generally, UE 812 may receive service from access network 800. In one aspect, a CRS pattern is common across a CoMP cluster 801, e.g., macro eNB 802 and RRHs 804 may transmit using a common CRS pattern. Further, access network 800 may include one or more other CoMP cluster 805 including one or more macro eNB/RRHs 806. In operation, CSI feedback may be obtained to assist UE 812 in communicating with macro eNB 802 and/or RRH 804 including information associated with interference 816 from another CoMP cluster 805.

In one aspect, UE 812 may be enabled to use a wireless protocol for communications with the CoMP cluster 801. Such communication protocols may include, but are not limited to, LTE release 8, LTE release 9, LTE release 10, LTE release 11, etc. To provide service to UE 812, channel estimation parameters may be obtained for a channel 814 to potentially be used between UE 812 and macro eNB 802, and/or for a channel 818 between UE 812 and RRH 804, and interference estimation parameters may be obtained to measure interference 816. In one aspect, interference 816 may potentially originate from other RRHs 804, macro eNB 802, and/or other CoMP clusters 805. Various schemes for configuring resource element patterns for various resource pattern groups (e.g., CoMP clusters) to allow a UE perform channel estimation and interference estimation are now presented.

Performing CoMP Feedback Under Multiple Channel and Interference Assumptions

Figure 9:
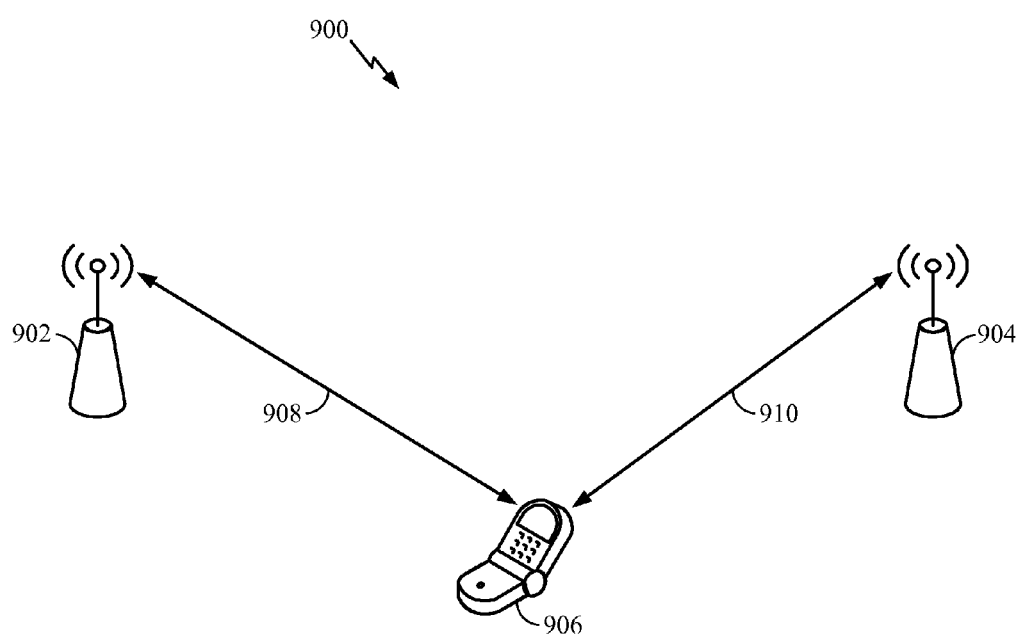
FIG. 9 is a diagram illustrating another example Macro eNB/RRH CoMP configuration in an access network.

FIG. 9 is a diagram illustrating an example access network 900 in which UE 906 may perform channel state measurements associated with multiple possible serving transmission points (902, 904). In one aspect, transmission points (902, 904) may be coordinated to operate as a CoMP cluster. Access network 900 may include support for multiple CoMP schemes including coordinated scheduling and/or coordinated beamforming, dynamic point selection (DPS), coherent and/or non-coherent joint transmission (JT), etc. Further, access network 900 may provide support for homogeneous and/or heterogeneous CoMP cluster operations.

In one aspect, CSI feedback reporting encompasses channel and interference measurement both of which may be facilitated through a combination of reference signals, including one or more Channel State Information Reference Signals (CSI-RS) and one or more Common Reference Signal (CRS). As used herein, a CSI-RS may be differentiated into non-zero power and zero-power CSI-RS. The non-zero power CSI-RS may include actual pilot transmissions with non-zero power that may be received by a UE 906 and used to measure channel and/or interference conditions. The zero-power CSI-RS, on the other hand, may represent one or more muted resource elements. Such muting may be used for interference measurement. The configuration of both zero-power and non-zero power CSI-RS resources may be UE 906 specific. Further, for a specific UE 906, multiple non-zero power CSI-RS resources and zero-power CSI-RS resources may be defined.

The CoMP schemes include CSI feedback reporting which may include multiple candidate transmission points for DPS. For coherent and/or non-coherent JT multiple transmission points (e.g., 902, 904) may contemporaneously transmit to the UE. CSI feedback reporting may be performed aperiodically and/or periodically. Aperiodic feedback may be performed on a per-request basis. Such aperiodic feedback may be triggered in access network 900 through a grant on PDCCH. Aperiodic CSI feedback reporting may be transmitted by UE 906 using an uplink data transmission (e.g., on PUSCH), thereby allowing for larger payload transmissions than would be available on the uplink control channel (e.g., PUCCH). Periodic feedback may include one or more reporting modes, and may follow a specific semi-statically configured timeline. Periodic CSI feedback reporting may be transmitted by UE 906 using the PUCCH, which allows for a more limited payload compared to the payload available for aperiodic feedback.

A UE may send multiple CSI feedback reports that are computed based on different sets of reference signal resources. Each CSI feedback report may include channel measurement, interference measurement, or any combination thereof. Feedback reporting using different sets of reference signal resources is useful as these reference signals may be indicative of different candidate transmission alternatives from which the network may select. For example, in one aspect, the UE 906 may be served either by transmission point 902 or by transmission point 904 as part of a DPS scheme. In such an aspect, UE 906 may be configured to perform measurements associated with two separate non-zero power CSI-RS resources for channel measurement. Further, UE 906 may report two sets of CSI reports, each indicative for one of the serving alternatives. Similar to the above channel measurement options, the UE 906 may perform various interference measurements for the purpose of CSI feedback reporting (e.g., which zero-power CSI-RS resources to use when performing interference measurements).

Signaling for CSI measurement and reporting configurations may include use of one or more resource pattern groups. Multiple groups of reference signal patterns may be used and these groups may constitute separate feedback reporting instances for which CSI feedback is reported. CSI reports for different groups may be indicative of different configurations of channel and/or interference measurement. As such, CSI reports for different groups may differ substantially. For each resource pattern group, a first and a second resource element pattern may be considered. The first resource element pattern may be used for channel measurement and may use one or more non-zero power CSI-RS resources. In an optional aspect, usage of a CRS pattern may also be considered. The second resource element pattern may be used for interference measurement and may include zero-power CSI-RS resources and/or CRS. Non-zero power CSI-RS resources may also be used for interference measurement, e.g., after subtracting the known pilot transmissions. The UE 906 may be informed of which CSI-RS resources to use through either explicit or implicit signaling, or a combination thereof. The first resource element pattern of different resource pattern groups may or may not correspond to the same CSI-RS resources. Similarly, the second resource element pattern of different resource pattern groups may or may not correspond to the same CSI-RS resources. For example, in one aspect, two resource pattern groups may be considered where both groups may have first resource element patterns that correspond to the same CSI-RS resources used for channel measurement while the groups may have different configurations for the second resource element pattern used for interference measurement.

Where explicit signaling is used, the UE 906 may be signaled through a new field which CSI-RS resource(s) should be used. Further, where explicit (e.g., dedicated) signaling is used, interference measurement resources may be signaled separately from the channel measurement resources through a combination of RRC and/or dynamic signaling. In one aspect, dynamic signaling may complement RRC signaling. For example, a total of four resources may be configured in RRC signaling, and dynamically signaling may include 2 bits; the 2 bits may indicate which of the RRC signaled resources the UE 906 should measure.

Where implicit signaling is used, the UE 906 may infer the one or more CSI-RS resources to use from the subframe in which the report is requested. The UE 906 may then combine the channel and interference measurements (908, 910) associated with each of the multiple transmission points (902, 904) into a single CSI report for each transmission point (902, 904) that is conveyed to the network.

For aperiodic feedback, the index of the one or more configured CSI-RS resources may be signaled using dynamically signaling. In one aspect, a combination of RRC and dynamic signaling can be used to configure which channel/interference resource the UE 906 should measure. As discussed supra, multiple groups of reference signal resources may be configured to enable CSI reporting indicative of different transmission alternatives. Each of these groups may include different channel and/or interference measurement resource patterns. Aperiodic reporting may include CSI computed based on different resource patterns for interference measurement. For example, even if a single reference signal pattern is configured for channel measurement, multiple CSI-RS resources may be configured for interference estimation in a reference subframe. UE 906 may generate separate aperiodic CSI feedback reports using these different resource patterns for interference measurement. Furthermore, where multiple resource pattern groups are measured, additional signaling may be used to convey to the UE 906 whether to compute rank indication, precoding matrix, and channel quality (RI/PMI/CQI) for each group or whether to report a subset of RI/PMI/CQI in certain CSI feedback reports. For example, UE 906 may report all of RI/PMI/CQI for one group, but only CQI for another group. In one aspect, the encoding of the CSI reports corresponding to different groups may be performed jointly to reduce feedback payload. For example, additional CQI reporting may be encoded as an offset (delta CQI) compared to an absolute CQI value in another report. In another aspect, additional CQI may be reported on a wideband and/or per-subband basis. In another aspect, for aperiodic reporting, the reference resource may be defined based on the subframe in which the request for the aperiodic CSI reports was received. An additional offset may be applied to capture processing delays. For example, based on the subframe in which the request for an aperiodic CSI report is received, a reference resource subframe may be determined. This determination may also depend on other parameters such as but not limited to what type of grant has triggered the aperiodic feedback request. In line with the reference signal resource patterns that fall into the reference subframe, one or more CSI feedback reports may be sent by the UE. In one aspect, a UE may be subject to an upper limit on how many resource patterns may be reported. In such an aspect, this upper limit may be configured through RRC signaling.

For periodic feedback, the one or more CSI-RS resources may be signaled as part of a reporting mode configuration. In one aspect, periodic feedback may report different channel/interference measurement configurations in separate reporting instances. In such an aspect, configuration of CSI-RS resources for channel/interference measurement can be made part of a semi-static configuration of the reporting mode. In another aspect, the UE 906 may determine, at least partially, what reference signal pattern groups to report in a certain periodic feedback reporting instance. In such an aspect, the UE 906 may report only the best (with respect to channel state information) reference signal pattern group at a time. The UE 906 may indicate as part of the report which reference signal pattern group was reported. In another aspect, the UE may cycle across several combinations in a pattern that is part of the feedback reporting configuration.

Figure 10:
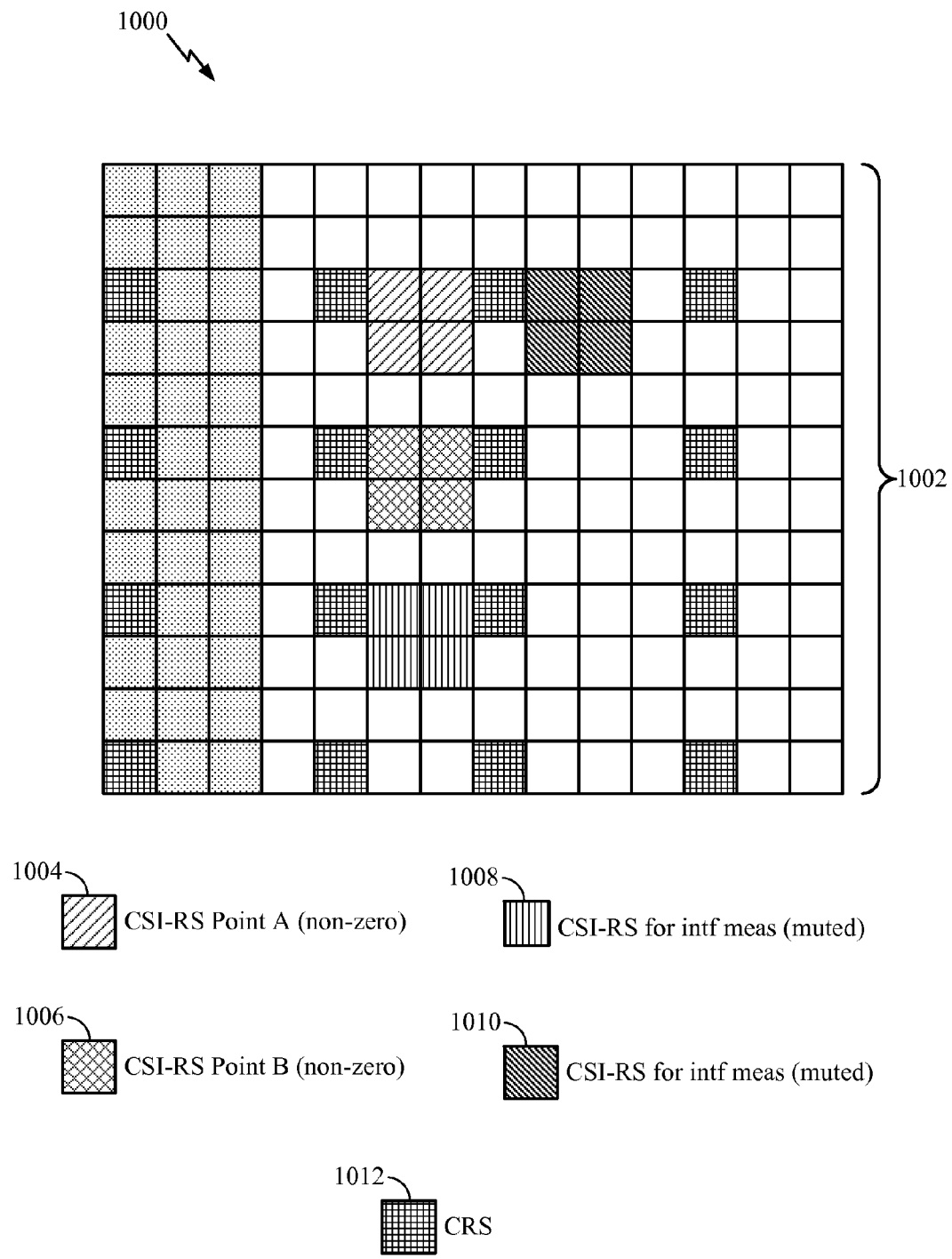
FIG. 10 is a diagram illustrating an example frame structure and resource element configuration to enable CSI measurements according to an aspect.
Figure 11:
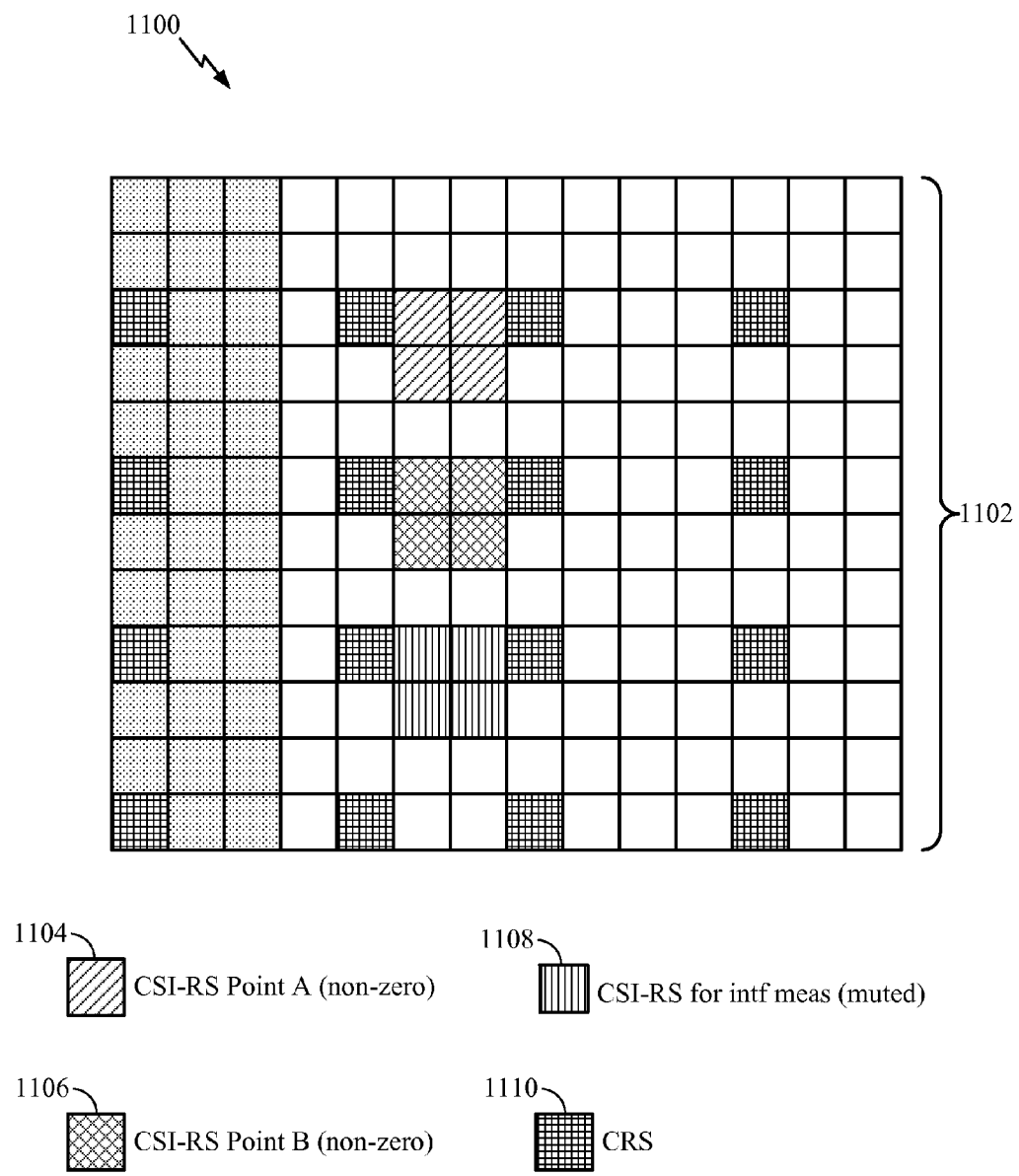
FIG. 11 is a diagram illustrating another example frame structure and resource element configuration to enable CSI measurements according to an aspect.

FIGS. 10 and 11 provide example CoMP schemes for CSI feedback reporting.

FIG. 10 is a diagram illustrating an example frame structure 1000 and resource element configuration 1002 to enable CSI measurements. Resource element configuration 1002 may include one or more resource elements 1004 allocated for channel estimation associated with a first transmission point (e.g., transmission point 902), one or more resources elements 1006 allocated for channel estimation associated with a second transmission point (e.g., transmission point 904), one or more resource elements 1008 allocated for interference estimation associated with a first transmission point (e.g., transmission point 902), one or more resources elements 1010 allocated for interference estimation associated with a second transmission point (e.g., transmission point 904), and one or more resources elements 1012 for a common reference signal (CRS).

Where CSI-RS resource configuration information is communicated through an implicit configuration, a linkage of channel and interference measurement resources implies that the interference measurement resources (1008, 1010) may be derived from the channel measurement resources (1004, 1006) configuration. In one aspect, implicit configuration may include mapping of channel and interference resources using a one-to-one mapping. In such an aspect, for any non-zero power CSI-RS resource for channel estimation (1004, 1006), there may be a dedicated interference measurement CSI-RS resource (1008, 1010). An interference measurement resource may be zero-power (e.g., muted) and/or non-zero power (e.g., not muted). Where the interference measurement resource is non-zero power, the UE (e.g., UE 906) may subtract one or more known pilot signals and use the resource elements for interference estimation. In such an aspect, separate signaling may include pilot information, pre-coding information, etc.

In another aspect, implicit configuration may include mapping of channel and interference resources using a one-to-many mapping. In such an aspect, multiple muted CSI-RS resources may be assigned for interference estimation without introducing ambiguity. In other words, a mapping from each channel estimation measurement resource (1004) to the set of interference measurement resources (1008, 1010) could be a direct mapping. Further, non-zero power CSI-RS resources (1004, 1006) may be used to supplement interference estimation by subtracting one or more known pilots from resource elements initially allocated to channel estimation and reusing the resource elements for interference estimation. In one aspect, mapping between channel and interference measurements resource elements may be different depending on a subframe, subframe set and/or subframe type.

As depicted in FIG. 10, feedback associated with a first transmission point (e.g., transmission point 902) may be obtained using resource element pattern 1004 for channel estimation and resource element pattern 1008 for interference estimation. Further, feedback associated with a second transmission point (e.g., transmission point 904) may be obtained using resource element pattern 1006 for channel estimation and resource element pattern 1010 for interference estimation. In one aspect, CRS 1012 may be used in combination with CSI-RS for interference estimation.

One of ordinary skill in the art would appreciate that although the above discussion refers to resource element patterns corresponding to individual transmission points, the disclosure also covers one or more other configurations. For example, the resource elements 1004, 1006 may not necessarily correspond a first transmission point and second transmission point, respectively. Rather, in one aspect, a single resource element pattern 1004 may span more than a single transmission point. Further, the specific mapping of CSI-RS ports to transmission points may be transparent to the UE.

FIG. 11 is a diagram illustrating an example frame structure 1100 and resource element configuration 1102 to enable CSI measurements. Resource element configuration 1102 may include one or more resources elements 1104 allocated for channel estimation associated with a first transmission point (e.g., transmission point 902), one or more resources elements 1106 allocated for channel estimation associated with a second transmission point (e.g., transmission point 904), one or more resources elements 1108 allocated for interference estimation to be shared among multiple transmission points (e.g., transmission point 902, 904), and one or more resources elements 1110 for a common reference signal (CRS).

Interference measurement resources 1108 sharing among multiple channel measurement resources allows for reduced system overhead. In an aspect in which two transmission points (e.g., 902, 904) are neighboring points, the interference measured on 1108 may include interference from points other than these two. However, in such a case, if the feedback report for either transmission point is computed using the shared interference measurement resource 1108, interference from the other transmission point may not be measured as part of the report. This deficiency may be undesirable from a network perspective, as multiple transmission points may be active and may generate interference (e.g., one transmission point 902 may serve UE 906 while the other transmission point 904 may serve a different UE and may result in interference to UE 906). To avoid unaccounted for interference, interference from one or more other transmission points (e.g., 904) may be incorporated based on channel measurement resource patterns associated with each of the other transmission points by adding the one or more channel measurements to the interference measurement obtained from the dedicated interference measurement resource. When adding interference based on the channel measurement resource of the other transmission point, a pre-coder assumption may need to be made as the pilot present on the channel measurement resource may differ from the pre-coder that may eventually be assigned by the network. In one aspect, signaling could be added to inform the UE (e.g., 906) what pre-coder assumption to use. For example, interference may be added using a full-rank (or hard-coded) pre-coder assumption, etc. In another aspect, each transmission point may offset the received CSI report based on scheduling decisions.

The above technique of "adding-back" interference may be applied in the cases other than where CSI-RS resources for interference estimation are shared among multiple transmission points. The method could be performed based on any non-zero power CSI-RS resource by indicating that the non-zero power CSI-RS represents an interference contribution and adding it to the interference estimate obtained from the dedicated interference measurement resources. The configuration of this procedure may be signaled explicitly through a combination of RRC and/or dynamic signaling. The implicit configuration options discussed above may be applied as well.

In another aspect, configuring separate resources for each of the two channel measurement resources may not be needed, and instead common resources may be used and interference for reporting purposes may be based on the channel measurement resource of the other transmission point.

In support of downlink coordinated multipoint (CoMP) operations, channel state information (CSI) feedback under multiple transmission or interference assumptions may be supported. To enable such feedback, channel measurement resources (CMRs) and interference measurement resources (IMRs) may be defined for CSI measurement by the UEs.

CMRs generally include one or more non-zero power reference signal (NZP-RS) resources that are employed, at least in part, to estimate channel conditions. According to an example, the NZP-RS resources may comprise non-zero power channel state information reference signal (NZP-CSI-RS) resources.

CMRs may be used to provide CSI under different serving assumptions. For example, in one aspect, multiple CMRs may facilitate dynamic point selection (DPS) in which CSI is reported for channel conditions from at least two separate transmission points to the UEs. CMRs may also be employed to facilitate other types of CoMP operations. The NZP-CSI-RS resources may amount to the CSI-RS resources configured in the CSI measurement set. The terms "cell" and "transmission point" may be used synonymously. For example, in CoMP Scn-3 where points are configured with different cell IDs, "cell" and "point" may be used interchangeably.

IMRs generally include zero power (ZP-RS) resources, NZP-RS resources, or a combination thereof. ZP-RS resources may include ZP-CSI-RS resources and NZP-RS may include NZP-CSI-RS resources. A UE may be configured to measure interference on one or more IMRs so as to provide CSI feedback under different interference assumptions. For each IMR, the UE may measure interference on the resources comprising this IMR. The network may facilitate the measurement under different interfering assumptions on different IMRs by scheduling transmissions accordingly. For example, in one aspect, the network may align interference conditions on IMR resources such that they are representative of the interference conditions that may be encountered by the UE during the actual data transmission.

Multiple CSI feedback reports may be enabled by providing a linkage between CMRs and IMRs. For example, in one aspect, multiple CSI feedback reporting configurations may be configured. Each CSI feedback reporting configuration generally includes a CMR and an IMR. For feedback reporting under a certain reporting configuration, the UE may then employ the CMR and IMR of this configuration to derive CSI feedback. The CMRs and IMRs need not be distinct between various CSI feedback reporting configurations. For example, two feedback reporting configurations may use the same IMR but different CMRs to derive feedback under a DPS feedback assumption. LTE Rel-10 supports CSI feedback under multiple interference hypotheses as part of enhanced inter-cell interference coordination (eICIC). Such feedback may be based on restricting the subframes across which the UE is allowed to average interference.

Each IMR consisting of only resource elements (REs) which can be configured as Rel-10 CSI-RS resources may limit the periodicity of IMRs to at most 5 ms. This is in contrast to the cell-specific reference signal (CRS) which may be available in every subframe. The difference in periodicity may not only affect the minimum reporting periodicity but also the configuration of resource restricted CSI measurements by means of CSI subframe sets.

In the eICIC context, CSI subframe sets may be used to generate CSI feedback under different interference assumptions (e.g., corresponding to "clean" and "unclean" subframes). In practice, a network implementation may align the configuration of these CSI subframe sets with the configuration of almost blank subframes (ABS) such that CSI feedback under a clean/unclean assumption may be observed by the UE.

When CSI subframe sets are used in conjunction with IMRs in Rel-11, the minimum periodicity of 5 ms may become an issue as there are fewer interference measurement instances. From a reporting perspective, the interference measurement associated with a specific subframe set may therefore be more outdated. However, this issue may not occur for CRS-based interference measurements as the CRS may be present in all subframes.

Interference measurement approaches may be differentiated according to the number of IMRs that are configured by the network. However, it may be beneficial from an overhead perspective to keep the number of configured IMRs as low as possible.

Figure 12:
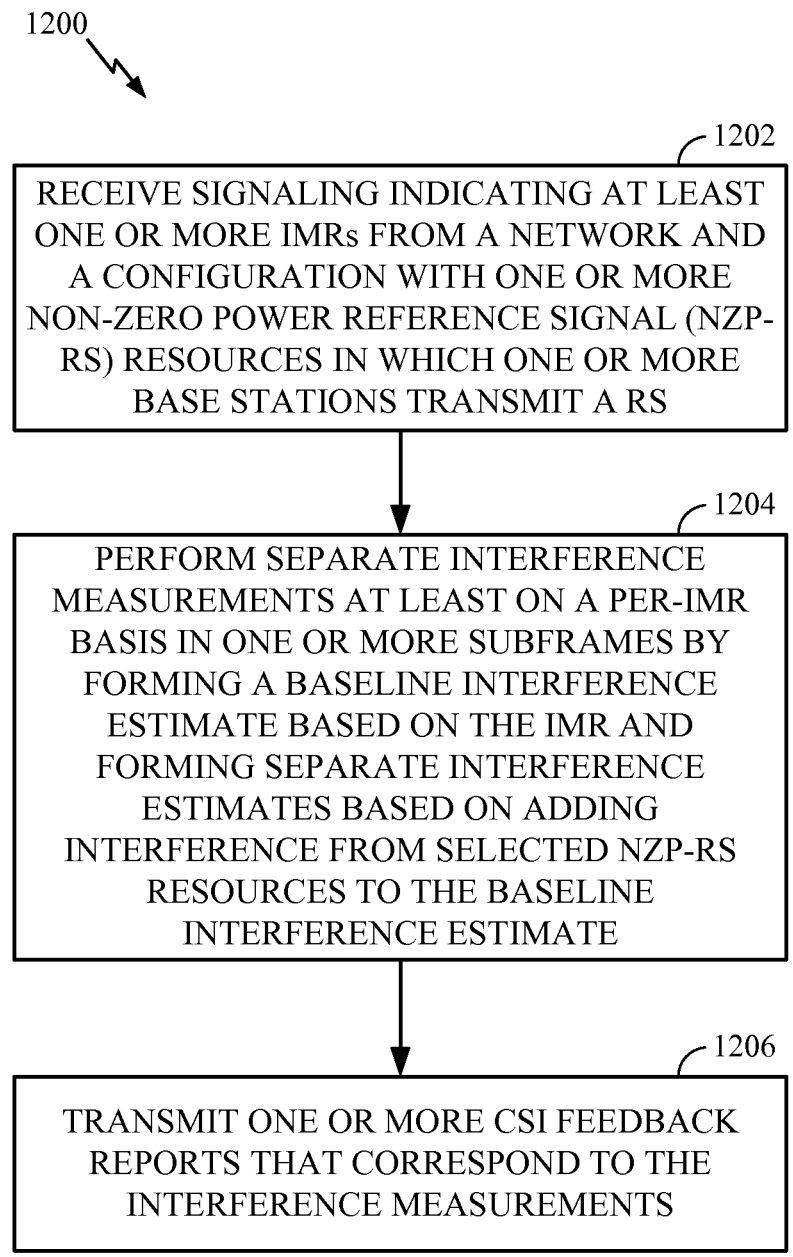
FIG. 12 illustrates example operations that may be performed, for example, by a UE, in accordance with certain aspects of the present disclosure.

FIG. 12 illustrates example operations 1200 that may be performed, for example, by a UE, in accordance with certain aspects of the present disclosure. At 1202, the UE may receive signaling indicating at least one or more IMRs from a network and a configuration with one or more non-zero power reference signal (NZP-RS) resources in which one or more base stations transmit a RS. At 1204, the UE may perform separate interference measurements at least on a per-IMR basis in one or more subframes by forming a baseline interference estimate based on the IMR and forming separate interference estimates based on adding interference from selected NZP-RS resources to the baseline interference estimate. According to one aspect, the one or more NZP-RS resources comprise one or more NZP-CSI-RS resources and the RS transmitted by the one or more base stations comprises a CSI-RS. At 1206, the UE may transmit one or more CSI feedback reports that correspond to the interference measurements.

Figure 13:
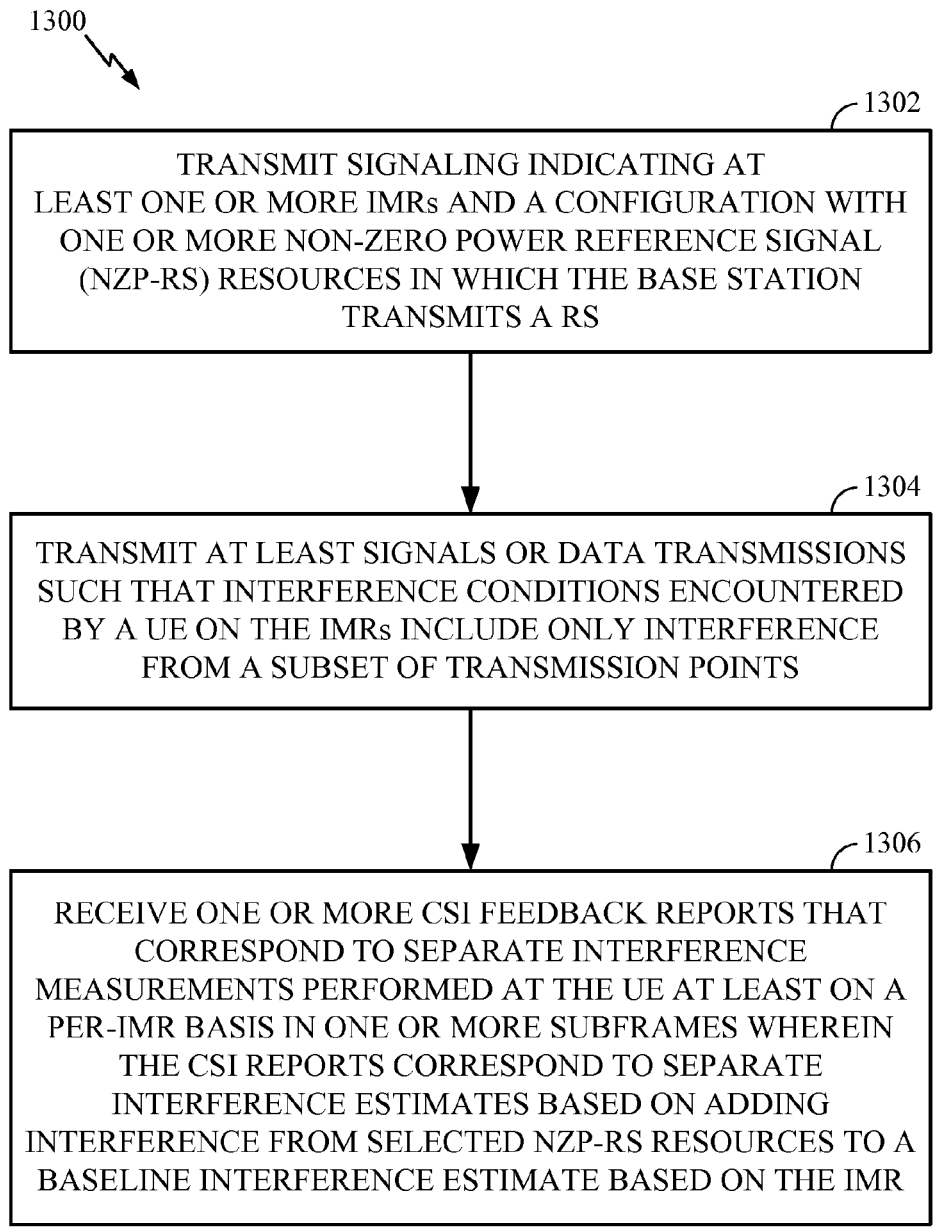
FIG. 13 illustrates example operations that may be performed, for example, by a base station, such as a node participating with other nodes in CoMP operations with a UE, in accordance with certain aspects of the present disclosure.

FIG. 13 illustrates example operations 1300 that may be performed, for example, by a base station, such as a node participating with other nodes in CoMP operations with a UE, in accordance with certain aspects of the present disclosure. At 1302, the base station may transmit signaling indicating at least one or more IMRs and a configuration with one or more NZP-RS resources in which the base station transmits a RS. At 1304, the base station may transmit at least signals or data transmissions such that interference conditions encountered by a UE on the IMRs may include only interference from a subset of transmission points. At 1306, the base station may receive one or more CSI feedback reports that correspond to separate interference measurements performed at the UE at least on a per-IMR basis in one or more subframes wherein the CSI reports correspond to separate interference estimates based on adding interference from selected NZP-RS resources to a baseline interference estimate based on the IMR. According to aspects, the one or more NZP-RS resources comprise one or more NZP-CSI-RS resources and the RS transmitted by the base station comprises a CSI-RS.

If only a single IMR is configured by the network, then this IMR, in effect, may take the place of the CRS tones that have been used for interference estimation in LTE Rel-10 and prior releases. The fact that LTE Rel-11 may explicitly standardize a configurable IMR may lead to increased flexibility at the network. In particular, the network may improve rate prediction by scheduling its signal transmissions (e.g., PDSCH, reference signals, or other signals) on a UE's IMR such that it is representative of the interference conditions that may be encountered during the actual data transmissions in later subframes. The fact that IMRs may be configured explicitly for UEs may improve the network's coordination ability as it has better control over how the UE performs interference measurement.

It may prove beneficial to support resource-restricted CSI measurement based on subframe sets in the case where a single IMR resource is configured. Conceptually, a single IMR resource may enable the same type of interference measurement that may be supported in Rel-10, aside from the improved configurability discussed above. To enable feedback under multiple interference hypotheses as in Rel-10, the averaging of CSI may be restricted to IMR instances that fall into the same CSI subframe set. In this way, the same type of feedback as in Rel-10 may be enabled. In other words, this may enable the configuration of two subframe sets, one that represents subframes on which macro interference is present, and one in which macro interference is absent. CSI reports for either of the subframe sets may be triggered in the same way as in Rel-10 and averaging of the CSI may be restricted to IMR occurrences that fall into the same subframe type (e.g., "clean" or "unclean" as discussed above).

As mentioned above, the network may schedule its signal transmissions (e.g., PDSCH, NZP CSI-RS, etc.) to collide with a UE's configured IMR such that the UE may measure interference conditions for a future transmission. When a UE's IMR is configured by the network to collide with NZP CSI-RS transmissions from other transmission points, it may be beneficial to allow for additional signaling that informs the UE which NZP-RS (e.g., NZP-CSI-RS) transmissions it should consider as part of forming the interference estimate. Specifically, based on this signaling, the UE may be instructed to include interference from certain NZP-RS (e.g., NZP-CSI-RS) resources while excluding it for others. The signaling may further be extended to allow for different interference hypotheses. For example, more than one interference hypothesis may be formed by the UE (and used for subsequent CSI reporting) based on signaling that instructs the UE to consider different sets of NZP CSI-RS resources as part of the interference.

Resource-restricted CSI measurements are not the only way of performing CSI feedback under multiple interference hypotheses. Specifically, in another aspect, it is possible to measure a baseline interference hypothesis based on a single configured IMR and then perform interference add-back under different assumptions at the UE side. This approach is different from configuring multiple IMRs as the interference add-back would typically be based on NZP CSI-RS resources (e.g., those NZP CSI-RS resources that are configured for channel measurement or CSI-RS based RSRP feedback).

In considering this approach, the question arises on how to guarantee that the single configured IMR may correspond to a consistent interference assumption, both on ABS and non-ABS subframes (or generally, on resources where the macro mutes or does not mute). To guarantee a consistent measurement, the configuration of ZP CSI-RS resources may be considered. In this case, the set of transmission points whose interference contributions should not be measured on the baseline IMR is excluded by configuring ZP CSI-RS resources on those REs which constitute the IMR.

Figure 14:
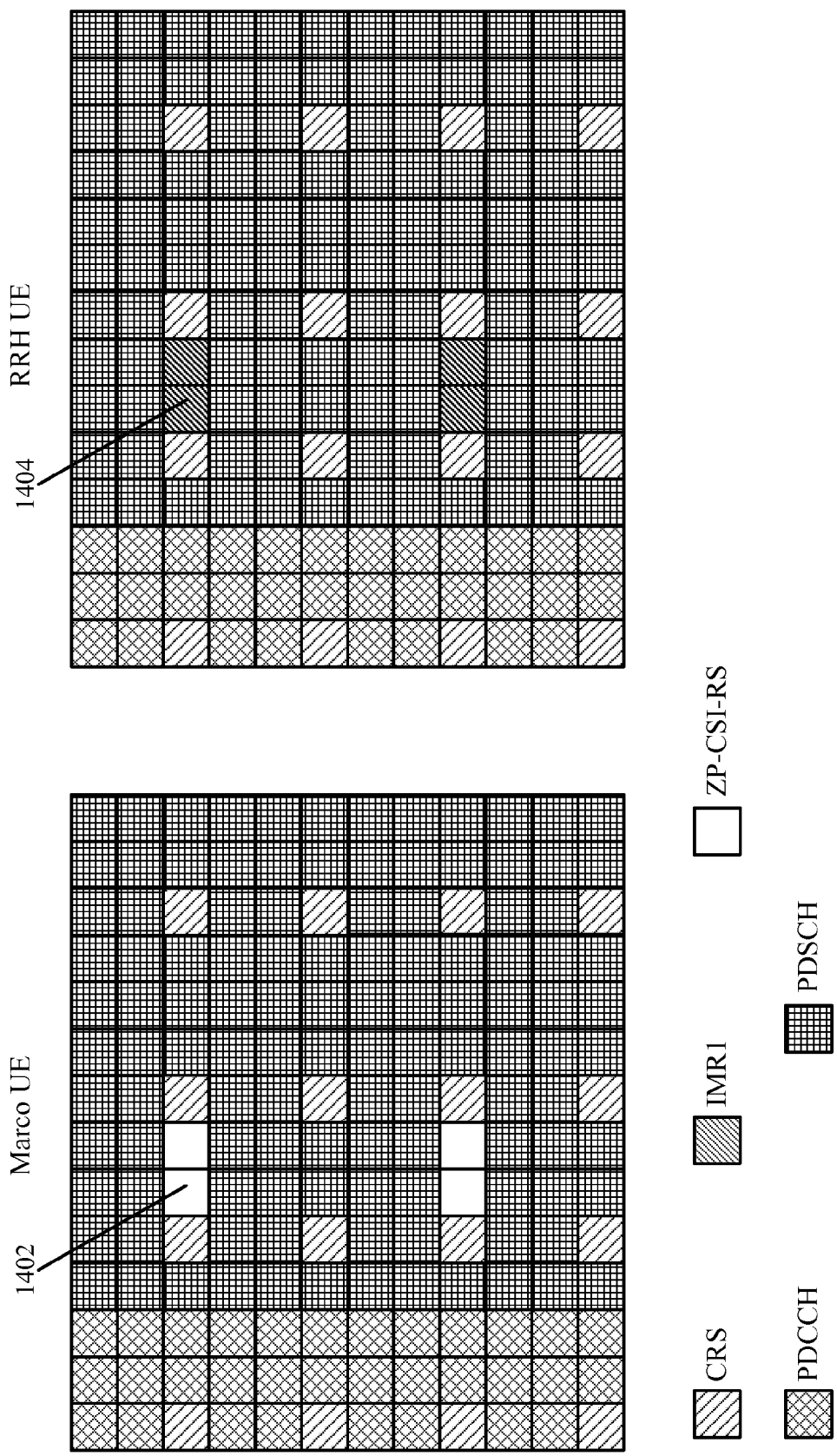
FIG. 14 illustrates an RRH UE that is configured with a baseline IMR that excludes interference from a dominant macro transmission point, in accordance with certain aspects of the present disclosure.

FIG. 14 illustrates an RRH UE that is configured with a baseline IMR that excludes interference from a dominant macro transmission point, in accordance with certain aspects of the present disclosure. To achieve this, the macro transmission point may configure one or more ZP CSI-RS resources 1402 that coincide with the RRH UE's IMR 1404. UEs that are served by the macro transmission point may thus be served in the same subframes on which the RRH UE measures interference but would incur larger overhead due to the muting of resources. A separately configured IMR (not shown) may be used by macro UEs for their interference measurement.

The add-back of interference under various hypotheses may be carried out based on NZP CSI-RS resources. It may not be necessary to configure separate NZP CSI-RS resources for this purpose as the NZP CSI-RS resources configured for channel measurement (i.e., the CSI-RS resources comprising the CoMP measurement set) may be reused. CSI-RS resources configured for CSI-RS based RSRP measurement may also be configured. It should be noted that the signaling of which resources to add-back, together with detailed assumptions on how the add-back is to be performed, may be signaled to the UE separately. However, for the actual channel measurement and add-back procedure it is possible to save overhead by linking to existing NZP CSI-RS resource transmissions. These existing NZP CSI-RS resources may include but should not be limited to CSI-RS resources configured for CSI feedback (in the CoMP measurement set) and/or CSI-RS resources configured in support of CSI-RS based RSRP measurements.

The procedure based on which to perform interference add-back may be signaled to the UE. This may include the precoder assumption for the interference add-back, including rank. Multiple precoders (e.g., a subset of an existing codebook) may be considered and averaging over multiple precoder assumptions may be performed.

Interference add-back may enable CSI feedback under multiple interference assumptions without the need for configuring resource-restricted feedback based on CSI subframe sets. However, even in the case where interference add-back is supported, it may be beneficial to improve the CSI measurement accuracy. Due to the difficulty and overhead associated with signaling precoder assumptions to the UE, interference measurement based on CSI subframe restriction may also be more accurate. Further, by configuring CSI subframe sets, the number of interference hypotheses that may be measured by the UE can be increased, without affecting system overhead (e.g., in terms of the number of configured ZP CSI-RS resources).

However, the interference add-back performed by the UE may lead to increased UE complexity. To limit such complexity, the configuration and signaling of interference add-back parameters may be limited to a certain number of hypotheses. This limitation may be specified in terms of the number of CSI-RS resources that may be considered for interference add-back and/or the number of precoder/muting assumptions that could be considered (or a combination of both). Further, in another aspect, if interference add-back based on more than one CSI-RS resource is configured, the number of total combinations among the configured CSI-RS resources may be constrained. For example, if three CSI-RS resources are configured for interference add-back then a total of 8 muting/no-muting configurations could be considered. As such a large number of interference hypotheses may become prohibitive from a UE complexity perspective, the number of combination may be limited (e.g., by RRC or dynamic configurations).

If two or more IMRs are configured for a UE, interference add-back may be avoided and CSI measurement under multiple interference hypotheses may instead be carried out based on the multiple IMRs. If the multiple IMRs are located in different subframes, then the network may induce different interference conditions on these IMRs by scheduling its PDSCH transmission appropriately. Examples include not scheduling any PDSCH transmission from certain points whose interference should not be included in the UE's interference measurement (e.g., by means of configuring ABS subframes). If IMRs are located in the same subframe, then the configuration of ZP CSI-RS resources may be considered at neighboring points such as to avoid interference from these points that are to be excluded from the UE's interference measurement.

Figure 15:
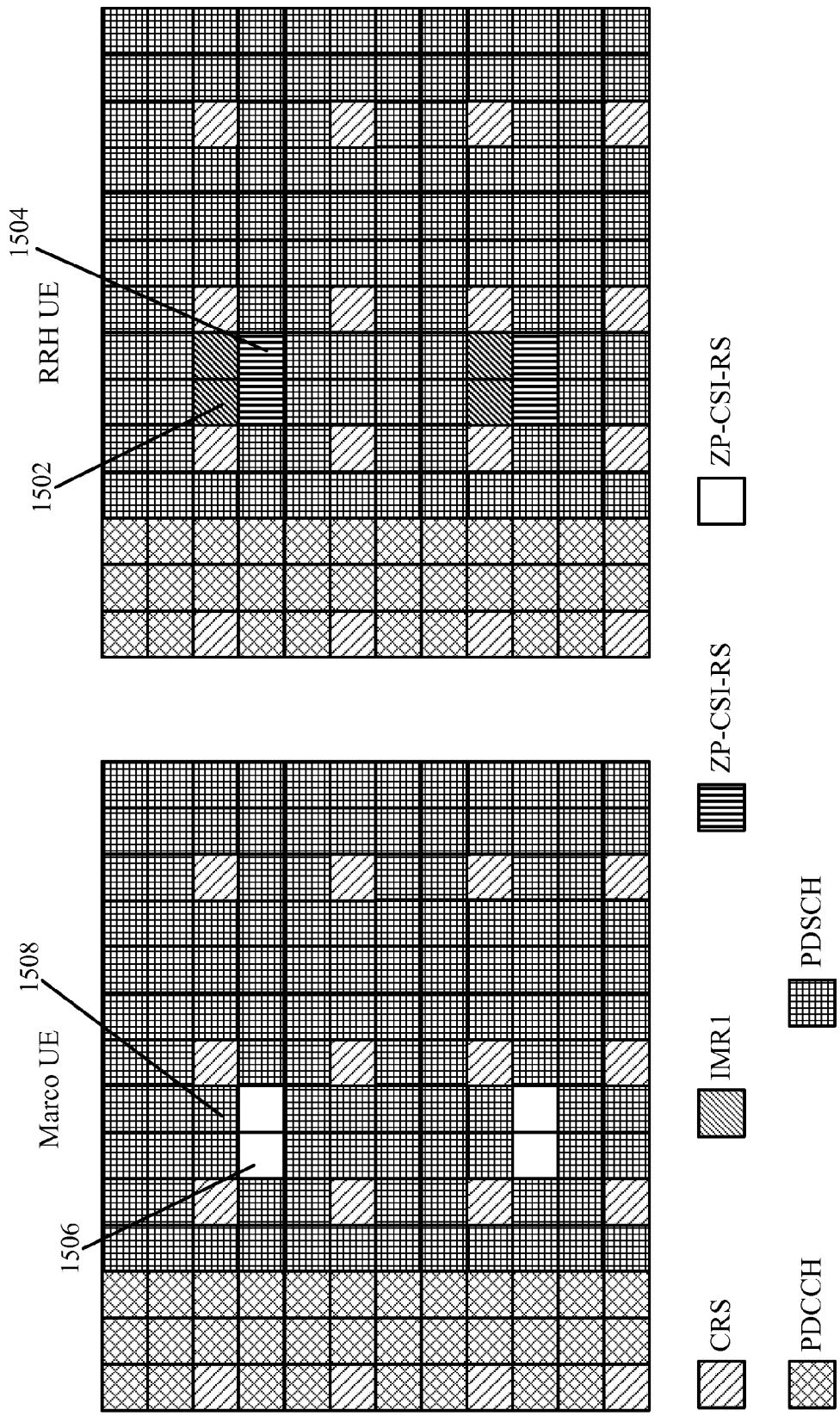
FIG. 15 illustrates an RRH UE that is configured with two IMRs, in accordance with certain aspects of the present disclosure.

FIG. 15 illustrates an RRH UE that is configured with two IMRs, in accordance with certain aspects of the present disclosure. In this scenario, an RRH UE may measure interference on two IMRs, namely IMR1 1502 and IMR2 1504. On both IMRs the baseline interference condition may correspond to interference contributions from PDSCH transmissions 1508 of adjacent cells. However, as discussed above, the contributions from certain points may be excluded by either not transmitting PDSCH from those points or by configuring ZP CSI-RS resources at those points (illustrated at 1506). The latter operation improves the flexibility of the network by enabling it to transmit PDSCH to certain UEs while not causing interference to those UEs that should not measure this interference for their CSI feedback reporting. It should be noted, however, that the configuration of additional ZP CSI-RS resources may lead to increased system overhead.

The interference measured on IMRs may not only consist of colliding PDSCH transmission 1508 from neighboring points. Instead, it may also include other signal transmissions such as CSI-RS or other reference signals. It may even comprise other types of signals that may be transmitted by the network to deliberately impact a UE's interference measurement. As long as the network configures a ZP CSI-RS resource for its own UEs, the transmission of such a signal may not impact system performance aside from the additional overhead associated with the configuration of the ZP CSI-RS resources.

As illustrated in FIG. 15, the RRH UE is configured with two IMRs, namely IMR1 1502, which is intended to measure the interference from all transmission points and IMR2 1504 which is intended to capture the interference excluding contributions from a designated macro point. In the illustration both IMRs may be configured in the same subframe. The measurement of IMR2 1504, which intends to exclude interference from a designated macro may be facilitated by configuring ZP CSI-RS resources 1506 at the macro transmission point that coincide with IMR2. In this way both "clean" and "unclean" CSI measurements may be supported in the same subframe without relying on CSI subframe sets or interference add-back.

It should be noted that the operation depicted in FIG. 15 comes at the expense of increased system overhead (due to the configuration of multiple IMRs and ZP CSI-RS resources at the macro). Further, as noted above, similar types of measurement may be supported using CSI subframe sets which do not incur additional overhead.

It should further be noted that by configuring multiple IMRs in different subframes, the issue of limited CSI-RS periodicity may be alleviated. While the periodicity of 5 ms holds for each configured IMR separately, they could be configured with different subframe offsets such as to result in a more frequent occurrence of subframes carrying IMRs.

The design discussed above is applicable to both backward-compatible carriers and non-backward compatible carriers (e.g., new carrier types). In new carrier types, CRS may not be present in every subframe (e.g., every 5 ms).

The cells involved in CoMP operation for a UE may evolve with the UE's channel and traffic conditions and the cells' loading conditions. While more cells in CoMP for the UE generally improves the UE's performance, it may also cause additional UE complexity (which increases UE's power consumption) and UL overhead, similar to the case in carrier aggregation. In carrier aggregation, a UE may be configured with a primary cell and one or more secondary cells. Activation and deactivation of a secondary cell may be performed, such that when the secondary cell is deactivated, the UE stops monitoring the secondary cell and does not have to report CSI for the secondary cell. This may result in UE battery power savings and improve UL overhead efficiency.

Similar mechanisms may also be introduced for a CoMP UE. In particular, a UE may receive signaling indicating that a cell in CoMP is a primary cell, while all other cells are secondary cells. All secondary cells may be subject to activation and deactivation, using the MAC approach as defined for carrier aggregation. When a cell is deactivated, the UE may discontinue monitoring the cell and stop reporting CSI for the cell.

In CoMP Scn-4 as well as other CoMP deployments, the activation/deactivation mechanisms may be applied within a single CoMP cell comprising macro and RRH transmission points. It should further be noted that the activation/deactivation procedures may be performed on a per-CSI-RS resource basis. This may reflect the fact that the notion of "points" may be transparent to the specification.

In yet another aspect, the activation/deactivation concept described above may also be applied to CSI reporting configurations (e.g., consisting each of a CMR and IMR) rather than to CSI-RS resources themselves. For example, this may be beneficial from a UE complexity point-of-view as it may allow a more rapid reconfiguration of what CSI computations the UE may have to perform without requiring a reconfiguration of CMRs or IMRs themselves.

In HetNet deployments, the concept of subframe shift has been considered as a way of avoiding collisions of certain signals/channels such as PSS/SSS or PBCH between cells such as macro and pico cells. The fact that these specific channels may only be present in specific subframes enables the avoidance of collisions by offsetting the subframe number between the macro and pico cells.

Figure 16:
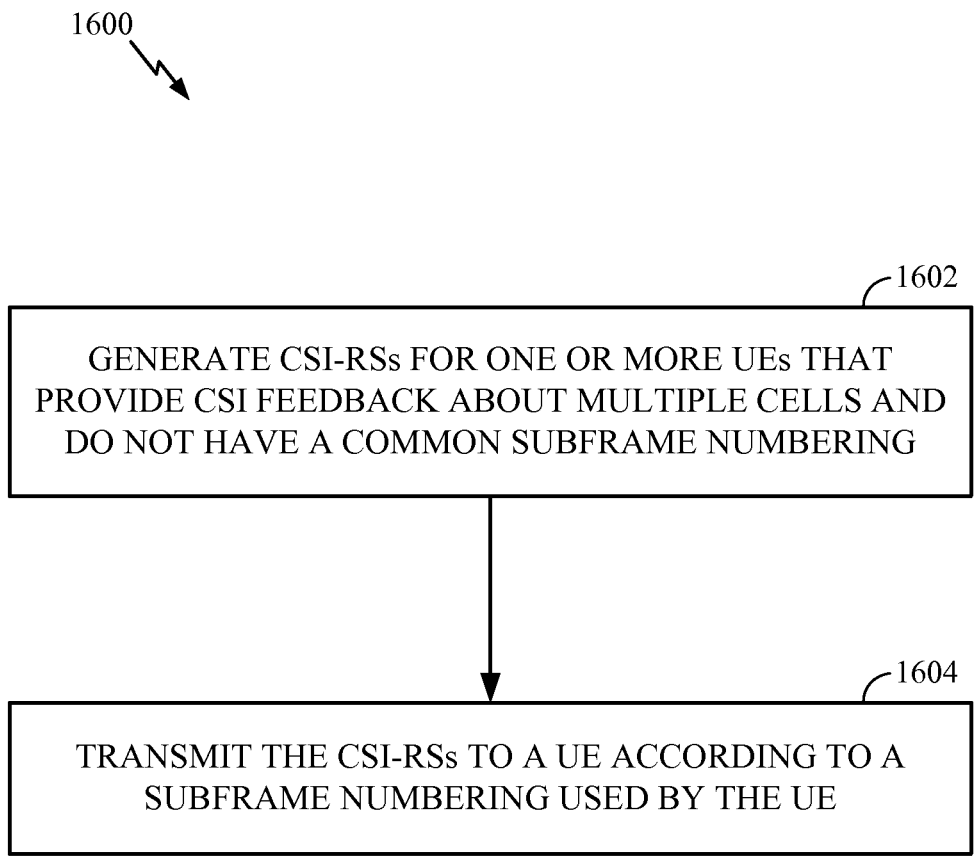
FIG. 16 illustrates example operations for transmitting RSs to UEs that do not have a common subframe numbering, in accordance with certain aspects of the present disclosure.

FIG. 16 illustrate example operations 1600 for transmitting RSs to UEs that do not have a common subframe numbering, in accordance with certain aspects of the present disclosure. The operations 1600 may be performed, for example, by a base station. At 1602, the base station may generate CSI-RSs for the one or more UEs that provide CSI feedback about multiple cells and do not have a common subframe numbering. At 1604, the base station may transmit the CSI-RSs to a UE according to a subframe numbering used by the UE.

Figure 17:
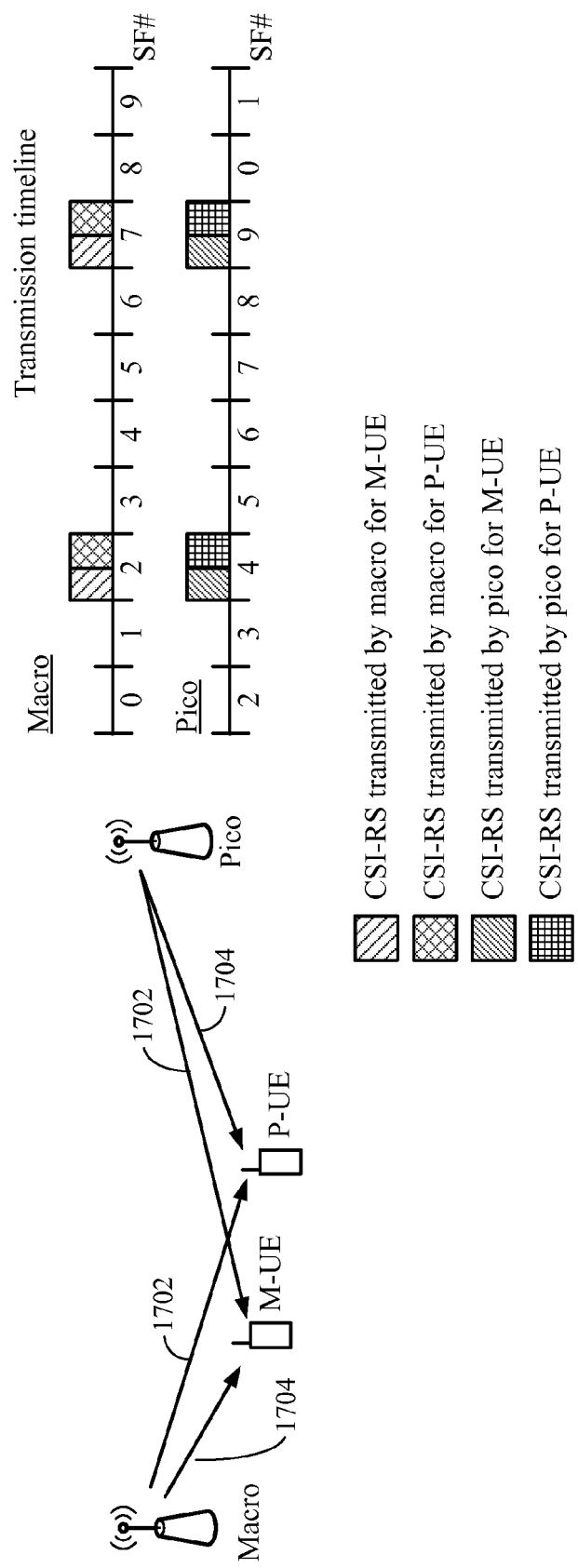
FIG. 17 provides an illustration of a CSI-RS resource configuration with a subframe offset between a macro and pico cells, in accordance with certain aspects of the present disclosure.

FIG. 17 provides an illustration of a CSI-RS resource configuration with a subframe offset between a macro and pico cells, in accordance with certain aspects of the present disclosure. An important feature of CoMP is feedback across multiple transmission points. As illustrated, a macro UE ("M-UE") and a pico UE ("P-UE") may perform feedback about both their serving cells as well as their neighboring cells (this is illustrated by 1704 and 1702, respectively). For example, with regards to the M-UE, the M-UE may perform feedback for CSI-RS resources 1702 received from the macro serving cell and CSI-RS resources 1704 received from the pico neighboring cell.

CSI-RS resources in Rel-11 may include the following signaling fields which may be configured independently for each CSI-RS resource: antennaPortsCount (number of CSI-RS antenna ports); resourceConfig (signaling of the REs (i.e., the pattern) used for transmission); subframeConfig (subframe configuration (e.g., offset and periodicity)); and parameter "X" for scrambling sequence initialization (virtual cell ID to use for scrambling sequence initialization).

When the subframe offset between the macro and pico cells is performed by the network, macro UEs and pico UEs may have a different numbering of the same physical subframe (as shown in FIG. 17). However, as the subframe offset may not be explicitly signaled as part of the CSI-RS configuration, the network configuration may be required to take this offset into account in the UE-specific configuration of CSI-RS resources.

As illustrated in FIG. 17, the subframe offset necessitates the signaling of a total of four CSI-RS resources to support simultaneous feedback to the macro and pico cells from both the macro UEs and pico UEs. Specifically, it may not be sufficient to configure only a single CSI-RS resource per macro and pico, respectively, because as a result of the subframe offset, macro and pico UEs may have a different starting point for the scrambling sequence initialization (since the scrambling initialization formula not only includes the parameter X but also the slot number). By configuring separate CSI-RS resources for macro and pico UEs, the macro and pico may compensate for the subframe offset at the transmitter side by transmitting the CSI-RS resources in accordance with the UE's understanding of the subframe numbering. In essence, the scrambling of the CSI-RS resources may follow the type of UE that the CSI-RS transmission is intended for, rather than the type of cell (macro/pico) which transmits the CSI-RS.

The configuration of multiple CSI-RS resources per UE-type may solve the issue of the scrambling sequence signaling. However, it also raises the question of whether CSI-RS muting can be configured in support of improving the channel estimation SINR on the CSI-RS tones. In Rel-10, the concept of CSI-RS muting was an important aspect and in HetNet setups it served the important use case of enhancing the SINR of the pico's CSI-RS transmission by muting the same resource elements at the macro side.

An important restriction of the Rel-10 muting configuration is that only a single periodicity and offset can be configured. Therefore, if the multiple CSI-RS resources, as illustrated in FIG. 17, were placed in different subframes, it may not be possible to mute for any of the CSI-RS resources due to signaling limitations. Therefore, all the CSI-RS resources may be placed in the same physical subframe. It is important to note that due to the configuration of subframe offset between macro and pico cells, the same physical subframe may actually corresponds to different numbers at the macro and pico cells. The offset may be compensated, however, within the supported Rel-10 signaling by setting the periodicity/offset of the CSI-RS muting appropriately.

Periodic feedback reporting in LTE supports CSI feedback that follows a predefined, periodic reporting timeline. When multiple feedback reporting instances are configured (e.g., to support CoMP feedback about multiple transmission points), these predefined timelines may collide in certain subframes. Due to uplink feedback constraints this may require the dropping of one or more of the colliding CSI reports. Alternatively, by utilizing uplink transmission formats with higher payload, feedback of multiple CSI may also be supported.

The collision of multiple periodic feedback reports is similar to the case of carrier aggregation in which CSI feedback of multiple component carriers may collide. For example, whenever multiple CSI reporting instances collide, they may be reported either with PUCCH Format 3 (if the higher payload of PUCCH Format 3 allows) or alternatively with a PUSCH transmission. The latter effectively corresponds to an uplink data transmission and can support high enough payload to feed back a large number of CSI reports.

For certain aspects, a dropping priority may also be established to help prioritize the dropping of CSI reports whenever multiple CSI feedback instances collide. The prioritization of the transmissions that actually take place can be based, at least in part, on a semi-statically or dynamically signaled priority index.

As of LTE Rel-8, the concept of codebook subset restriction is supported and may be signaled through the RRC configured parameter codebookSubsetRestriction. The parameter serves the purpose of restricting a UE's rank indicator (RI)/precoding matrix indicator (PMI) selection by allowing the deactivation of certain RI/PMI combinations through a bitmap. Any RI/PMI combination that is configured as deactivated may not be reported by the UE. Effectively, this parameter therefore restricts the admissible RI/PMI combinations reportable by the UE.

In CoMP it may be desirable to allow the configuration of multiple, separate codebook subset restrictions. For example, a single CMR may be reported under different IMR assumptions and it may be desirable to allow for separate codebook subset restrictions per interference assumption. A potential use case for this more flexible configuration is to allow for rank-restricted feedback per CSI reporting configuration. As different interference assumptions may give rise to different rank reports, it may be desirable to support such a more flexible configuration.

For certain aspects, a configuration of codebookSubsetRestriction on a per CSI reporting configuration may be allowed. In other words, codebookSubsetRestriction may be configurable for each CSI reporting configuration where each such configuration provides a linkage of a CMR and an IMR, respectively.

TS36.213 currently states that "for each RI reporting interval when the UE is configured in transmission modes 4 or when the UE is configured in transmission mode 8 or 9 with PMI/RI reporting, a UE shall determine a RI from the supported set of RI values for the corresponding eNodeB antenna configuration and UE category and report the number in each RI report."

In LTE Rel-11 this definition may no longer be sufficient as there could be aggregated feedback across points or more than one CMR configured. Therefore, the above reference to "eNodeB antenna configuration" may be ambiguous. In particular this is the case when a form of aggregated feedback across multiple transmission points is considered. In this case, the CMR generally includes two CSI-RS resources which are aggregated and used together to derive RI/PMI/CQI feedback. Consequently, when CoMP feedback is configured, a UE should therefore derive the RI bitwidth from a supported set of RI values corresponding to the maximum number of CSI-RS ports in its CMR, rather than based on the "eNodeB antenna configuration."

As mentioned earlier, a UE may be configured with more than one CMR. In another aspect, it could therefore be considered to determine the RI bitwidth based on the maximum number of CSI-RS ports across all configured CMRs of a UE. This proposal may show benefits in some scenarios, e.g., if a single RI report is generated that corresponds to more than one CMR (for example, if a joint RI is to be enforced across all CMRs). Otherwise, when a separate RI is reported by the UE for each CMR, it appears natural to determine the RI bitwidth based on the maximum number of ports of that configured CMR as discussed prior.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications by a user equipment (UE), comprising:
    receiving signaling indicating at least:
        one or more interference measurement resources (IMRs) from a network, and
        one or more subframe sets;
    performing interference measurements according to the one or more signaled IMRs;
    transmitting one or more channel state information (CSI) feedback reports that correspond to the interference measurements, wherein the one or more CSI feedback reports comprise CSI restricted to IMRs that occur in a same subframe set of the one or more signaled subframe sets;
    receiving further signaling indicating a deactivation of one or more of the IMRs; and
    discontinuing performing interference measurements or transmitting CSI feedback corresponding to the deactivated IMRs.

2. The method of claim 1, wherein the signaling further comprises a configuration with one or more non-zero power reference signal (NZP-RS) resources in which one or more base stations transmit a reference signal (RS), and wherein the one or more NZP-RS signal resources comprise one or more non-zero power channel state information reference signal (NZP-CSI-RS) resources and wherein the RS transmitted by the one or more base stations comprises a CSI-RS.

3. The method of claim 1, wherein the one or more IMRs correspond to a single IMR.

4. The method of claim 2, wherein the performing comprises performing separate interference measurements at least on a per-IMR basis in one or more subframes by forming a baseline interference estimate based on the IMR and forming separate interference estimates based on adding interference from selected NZP-RS resources to the baseline interference estimate, and wherein the adding of the interference from the selected NZP-CSI-RS resources is subject to specific, separately signaled, precoding assumptions.

5. The method of claim 4, wherein the one or more IMRs correspond to two or more IMRs.

6. The method of claim 5, wherein the per-IMR interference measurements are performed on a single subframe.

7. The method of claim 1, wherein the CSI feedback is transmitted to one or more base stations.

8. The method of claim 7, wherein the CSI feedback is transmitted using uplink transmission formats with a higher payload.

9. The method of claim 1, further comprising receiving further signaling indicating codebook subset restrictions for one or more reporting configurations.

10. The method of claim 9, wherein the restrictions for the one or more reporting configurations comprises restrictions for the one or more IMRs.

11. The method of claim 1, further comprising:
    generating a rank indicator (RI) report based on a number of CSI-RS ports across one or more channel measurement resources (CMRs).

12. An apparatus for wireless communications by a user equipment (UE), comprising:
    means for receiving signaling indicating at least:
        one or more interference measurement resources (IMRs) from a network, and
        one or more subframe sets;
    means for performing interference measurements according to the one or more signaled IMRs;
    means for transmitting one or more channel state information (CSI) feedback reports that correspond to the interference measurements, wherein the one or more CSI feedback reports comprise CSI restricted to IMRs that occur in a same subframe set of the one or more signaled subframe sets;
    means for receiving further signaling indicating a deactivation of one or more of the IMRs; and
    means for discontinuing performing interference measurements or transmitting CSI feedback corresponding to the deactivated IMRs.

13. The apparatus of claim 12, wherein the signaling further comprises a configuration with one or more non-zero power reference signal (NZP-RS) resources in which one or more base stations transmit a reference signal (RS), and wherein the one or more NZP-RS signal resources comprise one or more non-zero power channel state information reference signal (NZP-CSI-RS) resources and wherein the RS transmitted by the one or more base stations comprises a CSI-RS.

14. The apparatus of claim 12, wherein the one or more IMRs correspond to a single IMR.

15. The apparatus of claim 13, wherein the means for performing comprises means for performing separate interference measurements at least on a per-IMR basis in one or more subframes by forming a baseline interference estimate based on the IMR and means for forming separate interference estimates based on adding interference from selected NZP-RS resources to the baseline interference estimate, and wherein the adding of the interference from the selected NZP-CSI-RS resources is subject to specific, separately signaled, precoding assumptions.

16. The apparatus of claim 15, wherein the one or more IMRs correspond to two or more IMRs.

17. The apparatus of claim 16, wherein the per-IMR interference measurements are performed on a single subframe.

18. The apparatus of claim 12, wherein the CSI feedback is transmitted to one or more base stations.

19. The apparatus of claim 18, wherein the CSI feedback is transmitted using uplink transmission formats with a higher payload.

20. The apparatus of claim 12, further comprising means for receiving further signaling indicating codebook subset restrictions for one or more reporting configurations.

21. The apparatus of claim 20, wherein the restrictions for the one or more reporting configurations comprises restrictions for the one or more IMRs.

22. The apparatus of claim 12, further comprising:
means for generating a rank indicator (RI) report based on a number of CSI-RS ports across one or more channel measurement resources (CMRs).

23. An apparatus for wireless communications by a user equipment (UE), comprising:
at least one processor configured to:
receive signaling indicating at least:
one or more interference measurement resources (IMRs) from a network, and
one or more subframe sets;
perform interference measurements according to the one or more signaled IMRs; and
transmit one or more channel state information (CSI) feedback reports that correspond to the interference measurements, wherein the one or more CSI feedback reports comprise CSI restricted to IMRs that occur in a same subframe set of the one or more signaled subframe sets;
receive further signaling indicating a deactivation of one or more of the IMRs; and
discontinue performing interference measurements or transmitting CSI feedback corresponding to the deactivated IMRs; and
a memory coupled to the at least one processor.

24. A non-transitory computer-readable medium having code stored thereon, the code executable by one or more processors for:
receiving signaling indicating at least:
one or more interference measurement resources (IMRs) from a network, and
one or more subframe sets;
performing interference measurements according to the one or more signaled IMRs;
transmitting one or more channel state information (CSI) feedback reports that correspond to the interference measurements, wherein the one or more CSI feedback reports comprise CSI restricted to IMRs that occur in a same subframe set of the one or more signaled subframe sets;
receiving further signaling indicating a deactivation of one or more of the IMRs; and
discontinuing performing interference measurements or transmitting CSI feedback corresponding to the deactivated IMRs.

25. A method for wireless communications by a base station, comprising:
transmitting signaling indicating at least:
one or more interference measurement resources (IMRs), and
one or more subframe sets;
transmitting at least signals or data transmissions such that interference conditions encountered by a user equipment (UE) on the one or more IMRs include only interference from a subset of transmission points;
receiving one or more channel state information (CSI) feedback reports that correspond to separate interference measurements performed at the UE at least on a per-IMR basis in one or more subframes, wherein the one or more CSI feedback reports comprise CSI restricted to IMRs that occur in a same subframe set of the one or more signaled subframe sets; and
transmitting signaling indicating a deactivation of one or more of the IMRs, the signaling indicating that interference measurements are not to be performed or CSI feedback is not to be transmitted corresponding to the deactivated one or more IMRs.

26. The method of claim 25, wherein a configuration with one or more non-zero power reference signal (NZP-RS) resources in which the base station transmits a reference signal (RS), and wherein the one or more NZP-RS resources comprise one or more non-zero power channel state information reference signal (NZP-CSI-RS) resources and wherein the RS transmitted by the base station comprises a CSI-RS.

27. The method of claim 25, wherein the one or more IMRs correspond to a single IMR.

28. The method of claim 26, wherein the CSI reports correspond to separate interference estimates based on adding interference from selected NZP-RS resources to a baseline interference estimate based on the IMR, and wherein the adding of the interference from the selected NZP-CSI-RS resources is subject to specific, separately signaled, precoding assumptions.

29. The method of claim 27, wherein the base station avoids creating interference on the IMR by configuring one or more ZP-CSI-RS resources on resource elements comprising the IMR.

30. The method of claim 25, wherein the one or more IMRs correspond to two or more IMRs.

31. The method of claim 30, wherein the interference measurements performed at the UE at least on a per-IMR basis are performed on a single subframe.

32. The method of claim 30, wherein the base station avoids creating interference on a specific IMR by configuring one or more ZP-CSI-RS resources on resource elements comprising the IMR.

33. An apparatus for wireless communications by a base station, comprising:

means for transmitting signaling indicating at least:
one or more interference measurement resources (IMRs), and
one or more subframe sets;
means for transmitting at least signals or data transmissions such that interference conditions encountered by a user equipment (UE) on the one or more IMRs include only interference from a subset of transmission points;
means for receiving one or more channel state information (CSI) feedback reports that correspond to separate interference measurements performed at the UE at least on a per-IMR basis in one or more subframes, wherein the one or more CSI feedback reports comprise CSI restricted to IMRs that occur in a same subframe set of the one or more signaled subframe sets; and
means for transmitting signaling indicating a deactivation of one or more of the IMRs, the signaling indicating that interference measurements are not to be performed or CSI feedback is not to be transmitted corresponding to the deactivated one or more IMRs.

34. The method of claim 33, wherein a configuration with one or more non-zero power reference signal (NZP-RS) resources in which the base station transmits a reference signal (RS), and wherein the one or more NZP-RS resources comprise one or more non-zero power channel state information reference signal (NZP-CSI-RS) resources and wherein the RS transmitted by the base station comprises a CSI-RS.

35. The apparatus of claim 33, wherein the one or more IMRs correspond to a single IMR.

36. The apparatus of claim 34, wherein the CSI reports correspond to separate interference estimates based on adding interference from selected NZP-RS resources to a baseline interference estimate based on the IMR, and wherein the adding of the interference from the selected NZP-CSI-RS resources is subject to specific, separately signaled, precoding assumptions.

37. The apparatus of claim 35, wherein the base station avoids creating interference on the IMR by configuring one or more ZP-CSI-RS resources on resource elements comprising the IMR.

38. The apparatus of claim 33, wherein the one or more IMRs correspond to two or more IMRs.

39. The apparatus of claim 38, wherein the interference measurements performed at the UE at least on a per-IMR basis are performed on a single subframe.

40. The apparatus of claim 38, wherein the base station avoids creating interference on a specific IMR by configuring one or more ZP-CSI-RS resources on resource elements comprising the IMR.

41. An apparatus for wireless communications by a base station, comprising:
at least one processor configured to:
transmit signaling indicating at least:
one or more interference measurement resources (IMRs), and
one or more subframe sets;
transmit at least signals or data transmissions such that interference conditions encountered by a user equipment (UE) on the one or more IMRs include only interference from a subset of transmission points;
receive one or more channel state information (CSI) feedback reports that correspond to separate interference measurements performed at the UE at least on a per-IMR basis in one or more subframes, wherein the one or more CSI feedback reports comprise CSI restricted to IMRs that occur in a same subframe set of the one or more signaled subframe sets; and
transmit signaling indicating a deactivation of one or more of the IMRs, the signaling indicating that interference measurements are not to be performed or CSI feedback is not to be transmitted corresponding to the deactivated one or more IMRs; and
a memory coupled to the at least one processor.

42. A non-transitory computer-readable medium having code stored thereon, the code executable by one or more processors for:
transmitting signaling indicating at least:
one or more interference measurement resources (IMRs), and
one or more subframe sets;
transmitting at least signals or data transmissions such that interference conditions encountered by a user equipment (UE) on the one or more IMRs include only interference from a subset of transmission points;
receiving one or more channel state information (CSI) feedback reports that correspond to separate interference measurements performed at the UE at least on a per-IMR basis in one or more subframes, wherein the one or more CSI feedback reports comprise CSI restricted to IMRs that occur in a same subframe set of the one or more signaled subframe sets; and
transmitting signaling indicating a deactivation of one or more of the IMRs, the signaling indicating that interference measurements are not to be performed or CSI feedback is not to be transmitted corresponding to the deactivated one or more IMRs.

* * * * *